US012136786B2

(12) United States Patent
Mizutani

(10) Patent No.: US 12,136,786 B2
(45) Date of Patent: Nov. 5, 2024

(54) CONNECTOR DEVICE

(71) Applicant: JAPAN AVIATION ELECTRONICS INDUSTRY, LIMITED, Tokyo (JP)

(72) Inventor: Ryota Mizutani, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 382 days.

(21) Appl. No.: 17/828,101

(22) Filed: May 31, 2022

(65) Prior Publication Data

US 2022/0399680 A1 Dec. 15, 2022

(30) Foreign Application Priority Data

Jun. 14, 2021 (JP) ................................. 2021-098799

(51) Int. Cl.
*H01R 13/629* (2006.01)
*H01R 13/502* (2006.01)
(Continued)

(52) U.S. Cl.
CPC ..... *H01R 13/62938* (2013.01); *H01R 13/502* (2013.01); *H01R 13/53* (2013.01); *H01R 13/62927* (2013.01); *H01R 13/639* (2013.01)

(58) Field of Classification Search
CPC .. H01R 13/707; H01R 2201/26; H01R 13/02; H01R 13/62933; H01R 13/62938;
(Continued)

(56) References Cited

U.S. PATENT DOCUMENTS 6,619,970 B2 9/2003 Fukushima et al.
2019/0229466 A1* 7/2019 Tsukiyoshi ....... H01R 13/62938
2019/0393649 A1 12/2019 Yamane et al.

FOREIGN PATENT DOCUMENTS

CN 110086043 B * 1/2021 ....... H01R 13/62927
EP 3454428 A1 * 3/2019 ............. H01R 13/44
(Continued)

OTHER PUBLICATIONS

Office Action dated Dec. 18, 2023 issued in Korean patent application No. 10-2022-0054803 along with a corresponding English translation.

(Continued)

*Primary Examiner* — Jean F Duverne
(74) *Attorney, Agent, or Firm* — GREENBLUM & BERNSTEIN, P.L.C.

(57) ABSTRACT

A connector includes an interlock housing to which interlock terminals are provided in addition to a lever that performs connection and disconnection of main terminals with respect to a mating connector. Connection of HVILs is performed in a manner such that after the main terminals are mutually connected through a rotation operation of the lever, a sliding operation of the lever is performed and the interlock housing is pressed down to position the interlock housing on a closing position. Disconnection of the main terminals is performed in a manner such that after the interlock housing is pulled up and positioned on an opening position to mutually disconnect the HVILs, the sliding operation of the lever is performed and the rotation operation of the lever is performed.

8 Claims, 58 Drawing Sheets

(51) Int. Cl.
*H01R 13/53* (2006.01)
*H01R 13/639* (2006.01)

(58) Field of Classification Search
CPC .................. H01R 13/502; H01R 13/53; H01R 13/62927; H01R 13/639
See application file for complete search history.

(56) References Cited

FOREIGN PATENT DOCUMENTS

| | | |
|---|---|---|
| JP | 2003-100382 A | 4/2003 |
| KR | 10-0780678 | 11/2007 |
| KR | 10-0780682 | 11/2007 |
| WO | 2010/150975 | 12/2010 |

OTHER PUBLICATIONS

Extended European Search Report dated Oct. 17, 2022 issued in European Patent Application No. 22170254.1.

* cited by examiner

CONNECTOR DEVICE

TECHNICAL FIELD

The present invention relates to a connector device for high voltage and large current including a high-voltage interlock (HVIL).

BACKGROUND ART

FIG. 1 illustrates the configuration described in Japanese Patent Application Laid Open No. 2003-100382 as a conventional example of this kind of connector device, in which one connector housing 11 is mounted on the other connector housing 21 by operating a lever 12 attached to the one connector housing 11.

A terminal hood portion 11*a* is provided on the lower portion of the connector housing 11, and a pair of terminals (male terminals) 13 is provided in the terminal hood portion 11*a*. On the outer wall of the connector housing 11, a pair of guide pins 11*b* is provided in a protruding manner. The guide pins 11*b* are engaged with respective guide grooves 14 of the lever 12 which will be described later.

As illustrated in FIGS. 2A and 2B, the lever 12 includes a pair of arm plate portions 12*a* and 12*b* and an operation portion 12*c* that couples the arm plate portions 12*a* and 12*b* provided in a pair. The guide grooves 14 that horizontally extend are formed on the respective arm plate portions 12*a* and 12*b* provided in a pair. The guide pins 11*b*, which are provided in a pair, of the connector housing 11 are inserted into the respective guide grooves 14. Accordingly, the lever 12 is provided to be able to rotate and reciprocate with respect to the connector housing 11.

On the arm plate portions 12*a* and 12*b* provided in a pair, respective cam grooves 15 are formed in a pair. To the cam grooves 15, respective cam pins 21*a*, described later, of the other connector housing 21 are inserted when the one connector housing 11 is mounted on the other connector housing 21.

One of the pair of arm plate portions 12*a* and 12*b* is formed wider than the other. The arm plate portion 12*b* having the wider width is provided with a connector portion 12*d* and the connector portion 12*d* is provided with a fitting detection male terminal 16.

The other connector housing 21 has a substantially rectangular parallelepiped shape whose top surface is opened and whose inner space serves as a mounting space 21*b* of the connector housing 11. A terminal hood housing portion 21*c* is provided on a bottom surface portion, which is the bottom surface of the mounting space 21*b*, and a pair of terminals (female terminals) 22 is housed in the terminal hood housing portion 21*c*.

The respective cam pins 21*a* are provided in a pair in a protruding manner on symmetrical positions on an inner circumferential wall of the connector housing 21, and a connector portion 21*d* is further provided in the mounting space 21*b*. The connector portion 21*d* is provided with a pair of fitting detection female terminals 23 (refer to FIGS. 4A and 4B described later).

FIG. 3 illustrates states of the lever 12 together with the cam pin 21*a* of the other connector housing 21 in a process from a state before the one connector housing 11 is mounted on the other connector housing 21, illustrated in FIG. 1, through a state in which the one connector housing 11 is inserted into the mounting space 21*b* of the other connector housing 21 to a state in which the one connector housing 11 is mounted on the other connector housing 21. FIG. 3(*a*) illustrates a state in which the lever 12 is rotated from a rotation starting position illustrated in FIG. 1 to an arrow a direction to be positioned between the rotation starting position and a rotation completion position. FIG. 3(*b*) illustrates a state in which the lever 12 is positioned on the rotation completion position. Further, FIG. 3(*c*) illustrates a state in which the lever 12 is slid to an arrow b direction and is positioned on a fitting completion position.

The cam pins 21*a* of the other connector housing 21 that are inserted into the cam grooves 15 of the lever 12 move in the inside of the cam grooves 15 along with the rotation of the lever 12. Accordingly, the one connector housing 11 gradually approaches and moves into the other connector housing 21 and this approach brings the terminals 13 and 22 of both connector housings 11 and 21 into contact with each other by the time when the lever 12 comes to be positioned on the rotation completion position.

Then, when the lever 12 is slidingly moved in the arrow b direction from the rotation completion position to the fitting completion position, the fitting detection male terminals 16 of the lever 12 come into contact with the respective fitting detection female terminals 23, provided in a pair, of the other connector housing 21 by the time when the lever 12 comes to be positioned on the fitting completion position. FIGS. 4A and 4B illustrate a state in which the lever 12 is positioned on the fitting completion position and the mounting of one connector housing 11 onto the other connector housing 21 is completed.

The operation of the lever 12 is thus composed of two actions which are the rotation operation and the sliding operation. By the sliding operation after the rotation operation, the fitting detection male terminals 16 come into contact with the fitting detection female terminals 23 and the fitting is detected. This detection of the fitting allows a power source circuit to be in a conductive state and supply current between the terminals 13 and 22.

The operation of the lever 12 for shifting the power source circuit from the conductive state to a non-conductive state is composed of reverse two actions, where the power source circuit is turned off by the sliding operation performed first and the terminals 13 and the terminals 22 separate from each other through the rotation operation subsequently performed.

Accordingly, the power source circuit can be prevented from becoming into a conductive state before the operation of the lever 12 is completed and an occurrence of arc discharge can be prevented.

As described above, the connector device of the related art, illustrated in FIG. 1, performs connection and disconnection of terminals for large current through the rotation operation of the lever, and performs connection and disconnection of terminals for fitting detection, constituting HVILs, through the sliding operation of the lever. Accordingly, time difference is secured between connection or disconnection of terminals for large current and connection or disconnection of HVILs and thus, fitting and separation of the connector device is safely performed.

This is the method in which connection and disconnection of terminals for large current and connection and disconnection of HVILs are performed through the series of operations such as rotation and sliding of the lever. In this method, if the series of operations is performed quickly, a situation may be generated in which a sufficient time interval for securing safety is not secured between the connection or disconnection of terminals for large current and the connection or disconnection of HVILs.

SUMMARY OF THE INVENTION

An object of the present invention is to provide a connector device that provides a more sufficient time interval between connection or disconnection of terminals for large current and connection or disconnection of HVILs compared to the related art and whose fitting and separation work can be more safely performed than the related art.

According to the present invention, a connector device includes: a connector that includes a housing, a lever, a main terminal, an interlock housing, and an interlock terminal; and a mating connector that includes a mating housing, a mating main terminal, and a mating interlock terminal. A guide groove is formed on one of the lever and the housing and a guide shaft is formed on the other. The lever is attached to the housing so that the guide shaft is positioned on the guide groove and whereby the lever can rotate between a first position and a second position, on which the lever is to be positioned, and can slide between the second position and a third position, with respect to the housing. One of a cam groove and a driven boss which constitute a cam mechanism is formed on the lever and the other is formed on the mating housing. When the lever is rotated from the first position to the second position in a state in which the connector of which the lever is on the first position is on a fitting preparation position with respect to the mating connector, the connector is drawn to a fitting position, the fitting position being closer to the mating connector than the fitting preparation position, by the cam mechanism and the main terminal and the mating main terminal are mutually connected. When the lever is rotated from the second position to the first position in a state in which the connector of which the lever is on the second position is on the fitting position with respect to the mating connector, the connector is pushed back to the fitting preparation position by the cam mechanism and connection between the main terminal and the mating main terminal is released. The interlock terminal is attached to the interlock housing. A spring piece that has a protrusion portion, which protrudes outward, on an end thereof is formed on the interlock housing, and the protrusion portion is displaced from a natural position to a retracted position when the protrusion portion is pressed. The interlock housing is attached to the housing in a manner to be able to slide between an opening position and a closing position, on which the interlock housing is to be positioned, where in terms of the interlock housing on the opening position, when the protrusion portion is on the natural position, the protrusion portion is abutted on an abutting surface of the housing and whereby sliding of the interlock housing to the closing position is blocked, and when the protrusion portion is on the retracted position, sliding of the interlock housing to the closing position is possible. When the connector is on the fitting position with respect to the mating connector and the interlock housing is on the opening position, the interlock terminal and the mating interlock terminal are mutually disconnected. When the connector is on the fitting position with respect to the mating connector and the interlock housing is on the closing position, the interlock terminal and the mating interlock terminal are mutually connected. When the connector is on the fitting position with respect to the mating connector and the lever is on the second position, the protrusion portion is on the natural position. When the connector is on the fitting position with respect to the mating connector and the lever is on the third position, the protrusion portion is pressed by a pressing portion of the lever to be positioned on the retracted position.

EFFECTS OF THE INVENTION

According to the connector device of the present invention, connection of the HVILs is performed in a manner such that after the main terminals for large current are mutually connected through the rotation operation of the lever, the lever sliding operation is performed and the interlock housing is pressed down. Meanwhile, disconnection of the main terminals is performed in a manner such that after the HVILs are mutually disconnected by pulling up the interlock housing, the lever sliding operation is performed and the rotation operation of the lever is further performed.

Thus, additional time for operating the interlock housing is required compared to the conventional example in which connection and disconnection of terminals for large current and connection and disconnection of HVILs are performed through a rotation operation and sliding operation of a lever. This additional time produces a larger time difference between the connection or disconnection of main terminals for large current and the connection or disconnection of HVILs, being able to enhance safety in a fitting and separation work of the connector device compared to the related art.

DESCRIPTION OF REFERENCE NUMERALS

Figure 1:
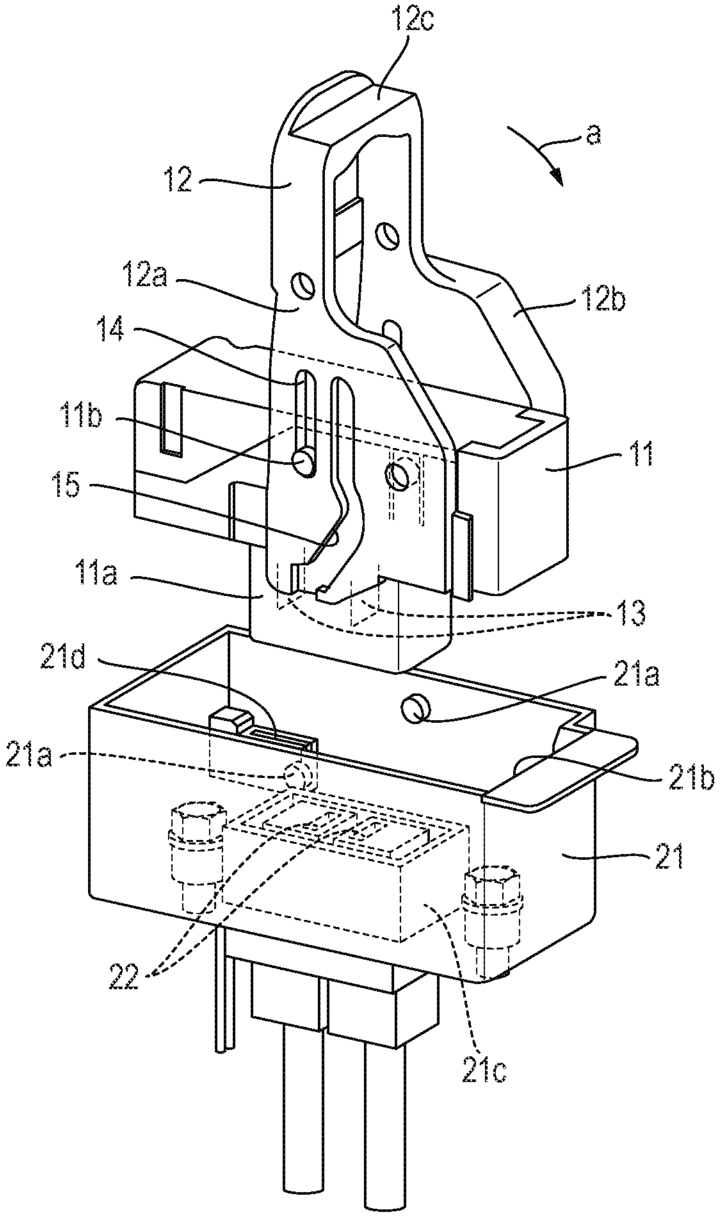
FIG. 1 (PRIOR ART)
FIG. 1 is a perspective view of a connector device (prior art).
Figure 2A:
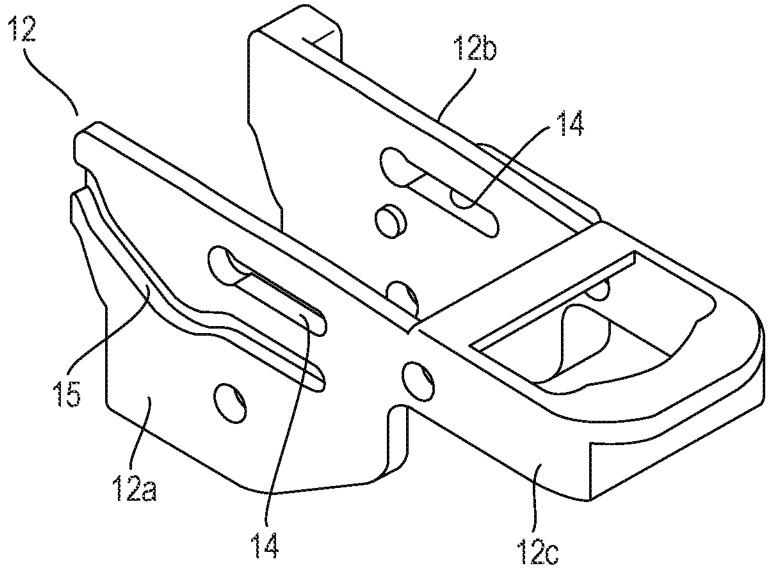
FIG. 2A (PRIOR ART)
FIG. 2A is a perspective view of a lever (prior art).
Figure 2B:
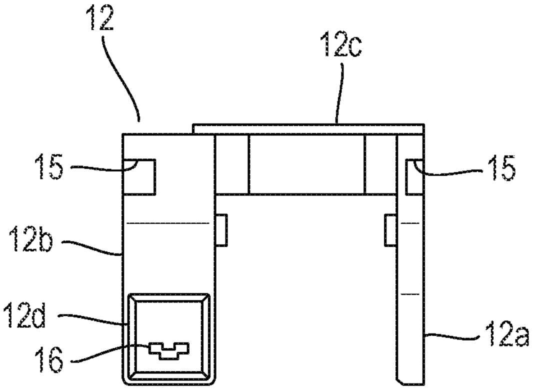
FIG. 2B (PRIOR ART)
FIG. 2B is a lateral view of the lever (prior art).
Figure 3:
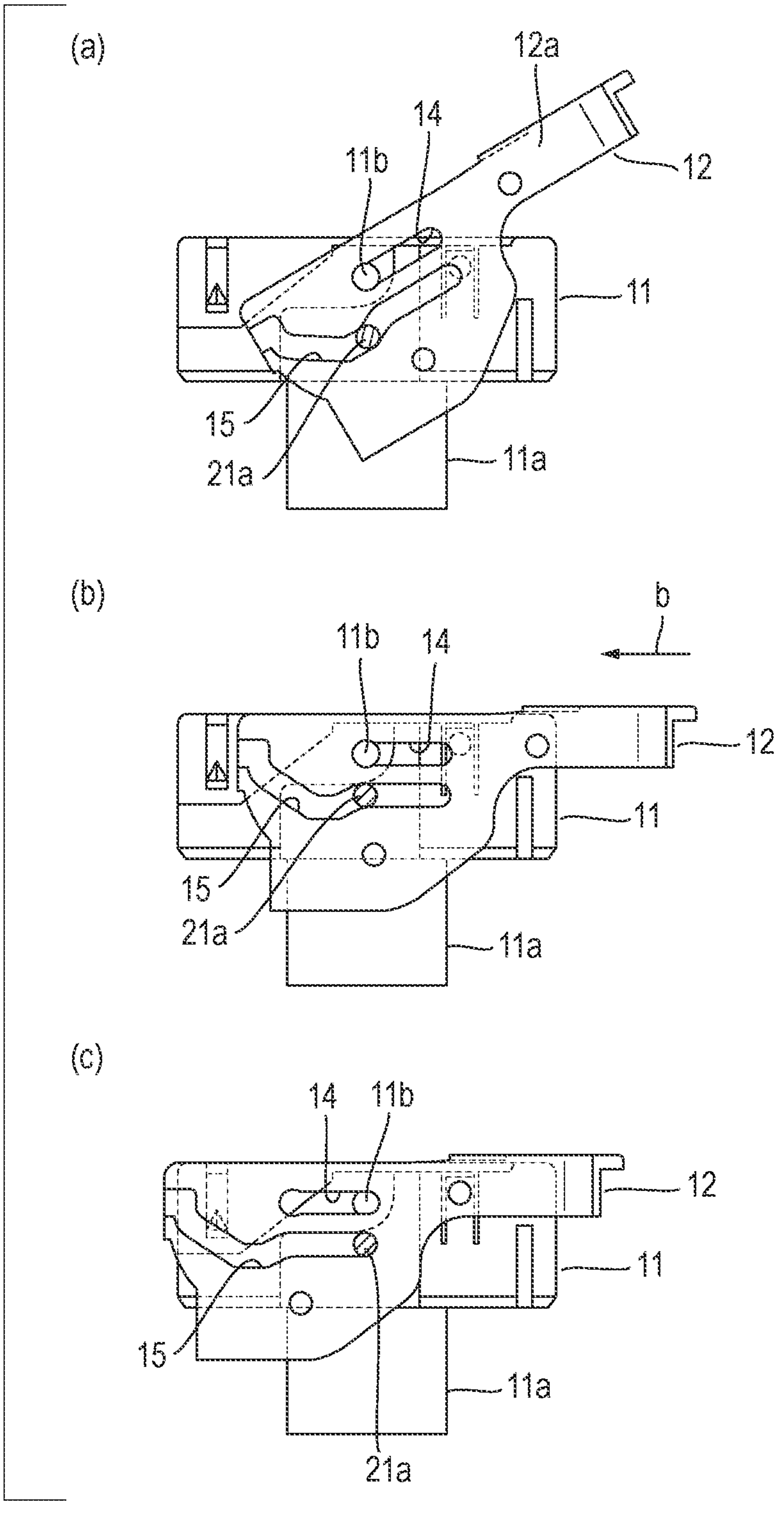
FIG. 3 (PRIOR ART)
FIG. 3 is a diagram illustrating states of the connector device in accordance with the position of the lever; (a) is an elevational view illustrating a state of the connector device (prior art) whose lever (prior art) is positioned between a rotation starting position and a rotation completion position, (b) is an elevational view illustrating a state of the connector device (prior art) whose lever (prior art) is positioned on the rotation completion position, and (c) is an elevational view illustrating a state of the connector device (prior art) whose lever (prior art) is positioned on a fitting completion position.
Figure 4A:
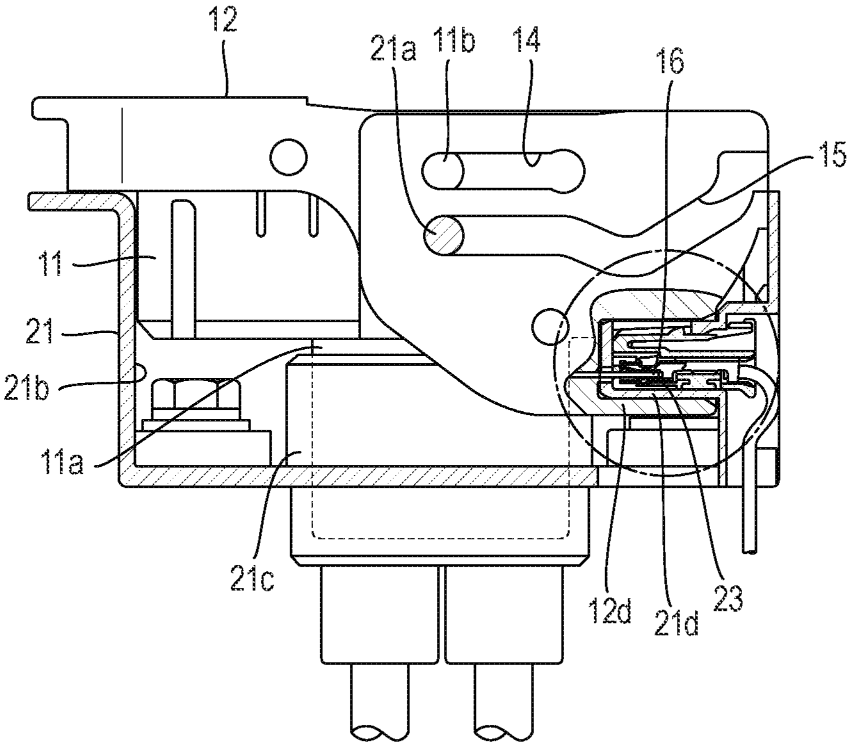
FIG. 4A (PRIOR ART)
FIG. 4A is a sectional view partially illustrating the connector device (prior art) in a mounting completion state.
Figure 4B:
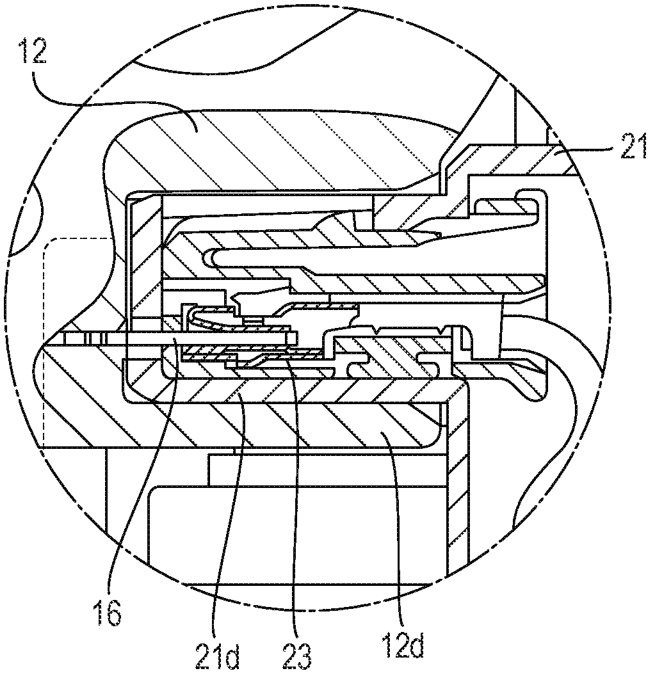
FIG. 4B (PRIOR ART)
FIG. 4B is an enlarged view illustrating principal portions of FIG. 4A.

11: connector housing
11*a*: terminal hood portion
11*b*: guide pin
12: lever
12*a*, 12*b*: arm plate portion
12*c*: operation portion
12*d*: connector portion
13: terminal
14: guide groove
15: cam groove
16: fitting detection male terminal
21: connector housing
21*a*: cam pin
21*b*: mounting space
21*c*: terminal hood housing portion
21*d*: connector portion
22: terminal
23: fitting detection female terminal
30: housing
31: fitting portion
32: cable housing portion
33: attaching portion
34: guide shaft
35: slit
35*a*: abutting surface
36: slit
37: engaging portion
38: concave portion
39: frame portion
40: lever
41: arm portion
41*a*: guide groove
41*b*: cam groove
41*c*: held portion
42: coupling portion
42*a*: opening
43: operation portion
43*a*: opening
44: reinforcing wall
45: wall portion
46: protruding portion
46*a*: slide insertion portion
46*b*: pressing portion
46*c*: blocked portion
47: held portion
50: interlock housing
51: cylindrical portion
51*a*: circumferential wall
52: operation portion
53: spring piece
53*a*: protrusion portion
54: lever slide blocking portion
55: locking piece
55*a*: operation protrusion portion
55*b*: protrusion
56: retaining piece
56*a*: protrusion
57: plate portion
58: stepped portion
60: interlock terminal
70: main terminal
80: cable cover
100: connector
110: mating housing
111: plate portion
112: fitted portion
112*a*: circumferential wall
113: driven boss
114: cutout
115: attaching portion
116: holding portion
116*a*: eaves-like portion
116*b*: upright portion
117: holding portion
117*a*: protrusion
120: mating main terminal
130: mating interlock terminal
200: mating connector
300: cable
400: connector
500: mating connector

DETAILED DESCRIPTION OF THE EMBODIMENTS

Embodiments will be described with reference to the accompanying drawings.

First Embodiment

Figure 5A:
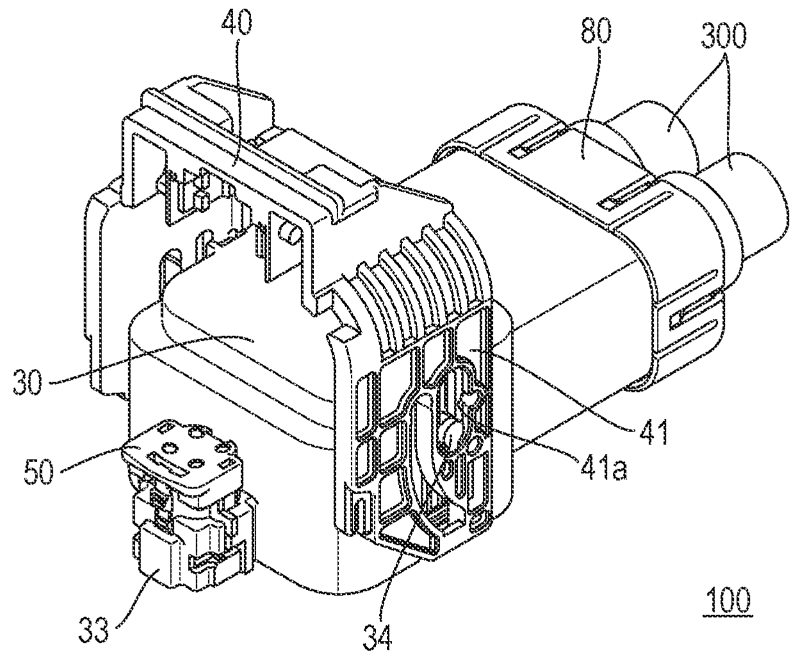
FIG. 5A is a perspective view of a connector included in a connector device according to a first embodiment viewed from obliquely above the front of the connector.
Figure 5B:
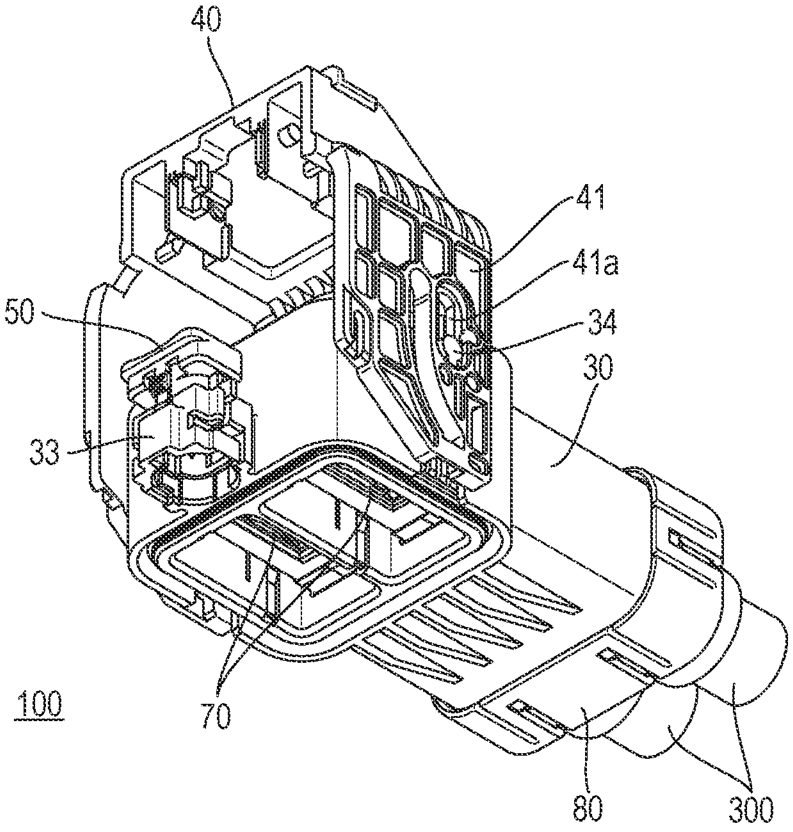
FIG. 5B is a perspective view of the connector included in the connector device according to the first embodiment viewed from obliquely below the front of the connector.

FIGS. 5A and 5B and FIGS. 6A, 6B, and 6C respectively illustrate a connector 100 and a mating connector 200 that constitute a connector device for high voltage and large current, including HVILs, according to a first embodiment. In FIGS. 5A and 5B, 30 denotes a housing and 40 denotes a lever. Further, 50 denotes an interlock housing and interlock terminals 60 are attached to the interlock housing 50 as described later. In FIGS. 5A and 5B, 300 denotes a cable. The connector 100 is attached to ends of two cables 300 in this example. In FIGS. 5A and 5B, 70 denotes main terminals that are respectively connected with the two cables 300 and 80 denotes a cable cover that is attached to the housing 30.

The configurations of the housing 30, the lever 40, and the interlock housing 50 of the connector 100 will be first described.

The housing 30 is roughly composed of a fitting portion 31, a cable housing portion 32 that follows the back portion of the fitting portion 31, and an attaching portion 33 that is positioned on the front surface of the fitting portion 31, as illustrated in FIGS. 7A, 7B, 7C, and 7D. The fitting portion 31 has a box-like shape whose bottom surface is opened. The main terminals 70 are housed and disposed in this fitting portion 31. On respective lateral surfaces of the fitting portion 31, guide shafts 34 are formed in a pair in a manner to protrude mutually outward.

The attaching portion 33 is a portion to which the interlock housing 50 is attached and has a substantially cylindrical shape that is opened in a vertical direction. On an intermediate portion of the attaching portion 33 in the vertical direction, slits 35 are formed in a pair on mutually opposed positions. The slit 35 extends from the front end to the rear side of the attaching portion 33. Further, slits 36 are formed in a pair on mutually opposed positions from the upper end of the attaching portion 33 to respective slits 35. The inner end sides of the slits 35 and the slits 36 communicate the inside and the outside of the attaching portion 33.

The lever 40 includes a pair of arm portions 41, a coupling portion 42, and an operation portion 43, as illustrated in FIGS. 8A, 8B, 8C, 8D, 8E, and 8F. The arm portion 41 has a plate shape. The coupling portion 42 couples base ends of the arm portions 41 provided in a pair. The operation portion 43 is positioned on an opposite side to the arm portions 41 with the coupling portion 42 interposed therebetween. The operation portion 43 is positioned on the lower end side of the coupling portion 42, and reinforcing walls 44, which are provided in a pair and extend in the vertical direction, are positioned on both ends in the width direction of the operation portion 43 in a manner to be continuously formed between the coupling portion 42 and the operation portion 43.

On the respective arm portions 41 provided in a pair, guide grooves 41*a* are formed and cam grooves 41*b* are further formed. The guide grooves 41*a* extend in an elongated direction of the arm portions 41. The cam groove 41*b* has a curved shape and the end of the cam groove 41*b* is positioned on the end of the arm portion 41, as illustrated in FIGS. 8A, 8B, 8C, 8D, 8E, and 8F. Further, held portions 41*c* having a concave portion shape are formed on outer surfaces on the lower end sides of ends of respective arm portions 41.

An opening 42*a* is formed on the lower half portion side of the coupling portion 42 and an opening 43*a* is also formed on the operation portion 43. The opening 43*a* communicates with the opening 42*a*. On both sides in the width direction of the opening 43*a* of the operation portion 43, wall portions 45 extending in the vertical direction are respectively formed. In the mutually-inner sides of a pair of wall portions 45, protruding portions 46 are formed in a pair along respective wall portions 45.

The protruding portion 46 has an L-shaped cross section and extends in an elongated direction of the arm portion 41. One half portions of respective L shapes that are orthogonal to the respective wall portions 45 and mutually protrude inward serve as slide insertion portions 46*a*. An end, positioned closer to the arm portion 41, of the slide insertion portion 46*a* functions as a pressing portion 46*b* and a cut out portion adjacent to the pressing portion 46*b* functions as a blocked portion 46*c*. On respective outer surfaces of the pair of wall portions 45, held portions 47 having a shaft shape are formed in a protruding manner.

The interlock housing 50 includes a cylindrical portion 51 and an operation portion 52 as illustrated in FIGS. 9A, 9B, 9C, 9D, and 9E. The operation portion 52 is positioned on an upper end of the cylindrical portion 51 and has a shape to lid the cylindrical portion 51. The interlock terminals 60 which serve as short terminals are attached and fixed in the inside of the cylindrical portion 51.

On the cylindrical portion 51, a pair of spring pieces 53, a pair of lever slide blocking portions 54, a locking piece 55, and a retaining piece 56 are integrally formed. The spring pieces 53, provided in a pair, are formed by making slits in the vertical direction on a circumferential wall 51*a* of the cylindrical portion 51, on mutually opposed positions on the circumferential wall 51*a*. Upper ends of the pair of spring pieces 53 are base ends and on lower ends (edges) thereof, protrusion portions 53*a* are formed in a manner to protrude mutually outward.

When the protruding direction of the protrusion portions 53*a* of the pair of spring pieces 53 is defined as a left-right direction, the locking piece 55 is formed in a manner such that the locking piece 55 is elongated upward from the lower end of the circumferential wall 51*a* at the front side of the circumferential wall 51*a*. On the end (upper end) of the locking piece 55, an operation protrusion portion 55*a* is formed in a manner to protrude frontward. In the middle of the elongated direction of the locking piece 55, a protrusion 55*b* is formed in a manner to protrude frontward. The retaining piece 56 is formed on a position, opposed to the position of the locking piece 55, on the circumferential wall 51*a* in a manner such that the retaining piece 56 is elongated upward from the lower end of the circumferential wall 51*a*. On the end of the retaining piece 56, a protrusion 56*a* is formed in a manner to protrude rearward.

The lever slide blocking portions 54, provided in a pair, are formed adjacent to respective spring pieces 53 on the frontward side, that is, on the side on which the locking piece 55 is positioned. The lever slide blocking portions 54 are formed in a manner to be protruded and extended outward from respective plate portions 57, which are formed in a manner to protrude mutually outward from the circumferential wall 51*a* and extend in the vertical direction.

The interlock housing 50 that has the above-described configuration and holds the interlock terminals 60 is inserted from the upper side and attached to the attaching portion 33 of the housing 30, and the interlock housing 50 is retained in a manner such that the protrusion 56*a* of the retaining piece 56 is caught. Further, the lever 40 is attached to the housing 30 in a manner such that the guide shafts 34, provided in a pair, of the housing 30 are inserted in and positioned on the respective guide grooves 41*a* of the pair of arm portions 41. The lever 40 can rotate between a first position and a second position, on which the lever 40 is to be positioned, and can slide between the second position and a third position with respect to the housing 30, as described later. FIGS. 5A and 5B illustrate a state in which the lever 40 is on the first position.

Figure 6A:
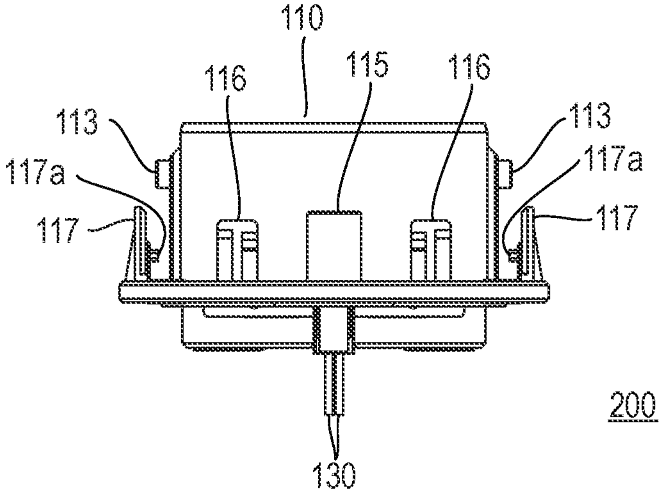
FIG. 6A is an elevational view of a mating connector included in the connector device according to the first embodiment.
Figure 6B:
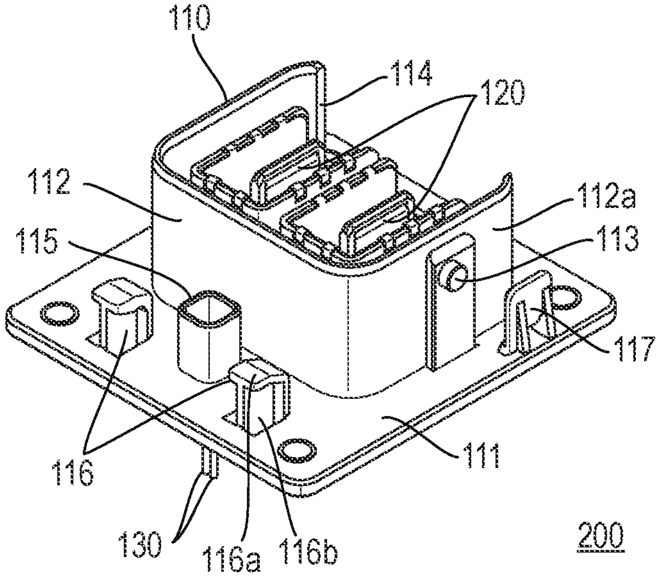
FIG. 6B is a perspective view of the mating connector included in the connector device according to the first embodiment viewed from obliquely above the front of the mating connector.
Figure 6C:
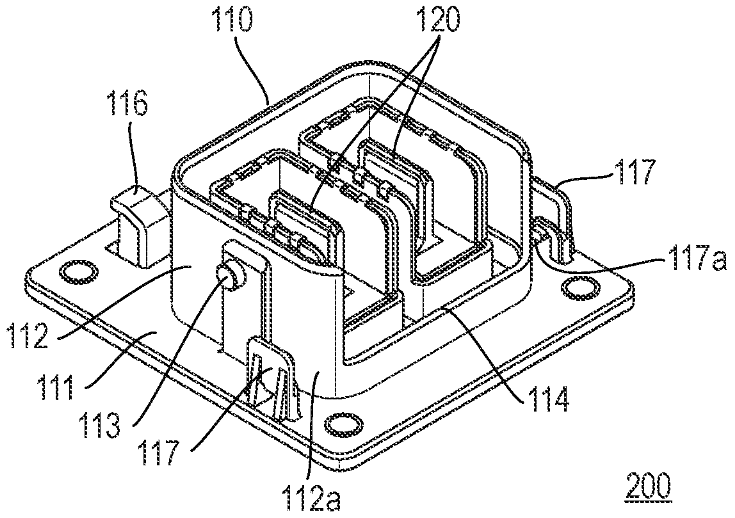
FIG. 6C is a perspective view of the mating connector included in the connector device according to the first embodiment viewed from obliquely above the back of the mating connector.
Figure 7A:
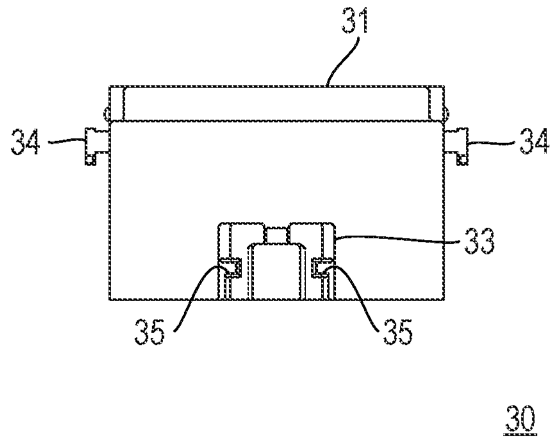
FIG. 7A is an elevational view of a housing.
Figure 7B:
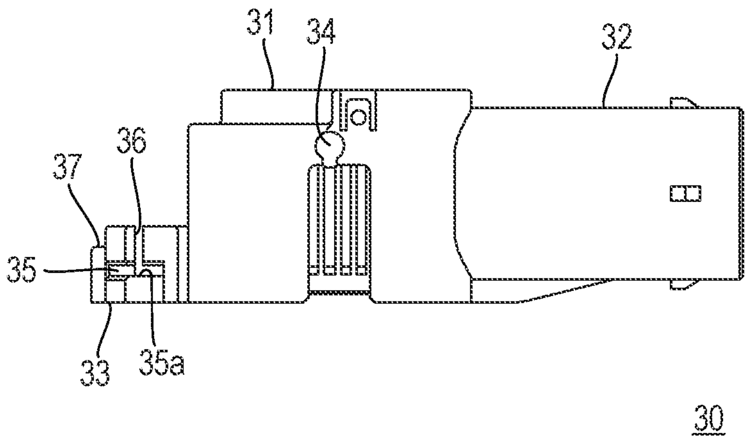
FIG. 7B is a right side view of the housing.
Figure 7C:
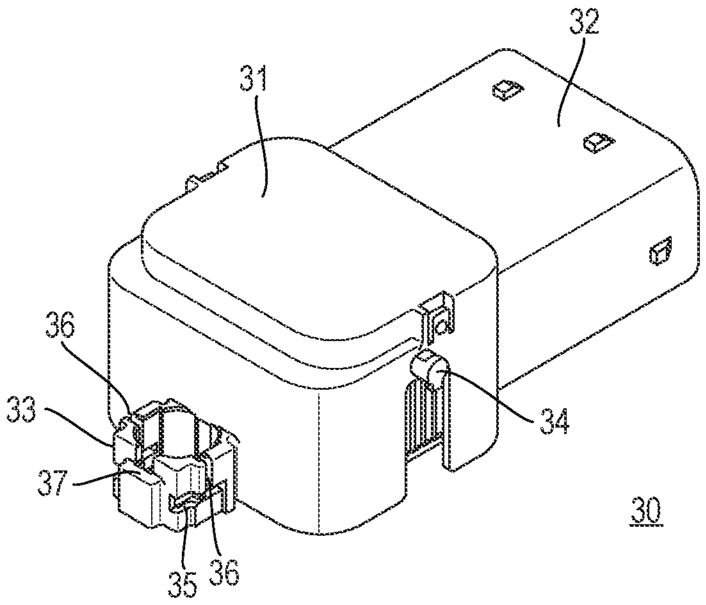
FIG. 7C is a perspective view of the housing viewed from obliquely above the front of the housing.
Figure 7D:
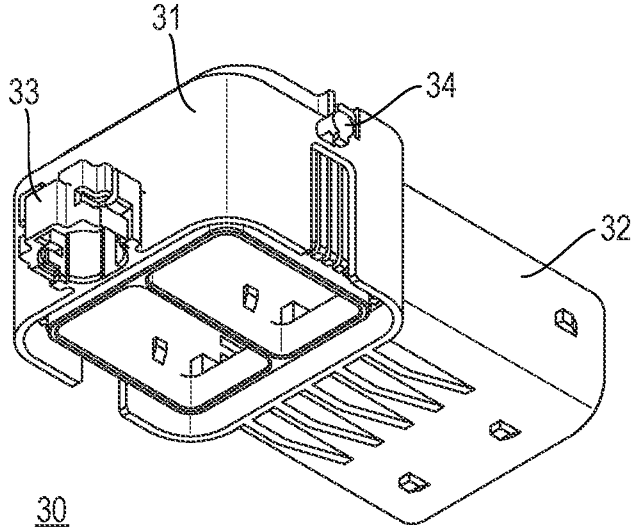
FIG. 7D is a perspective view of the housing viewed from obliquely below the front of the housing.
Figure 8A:
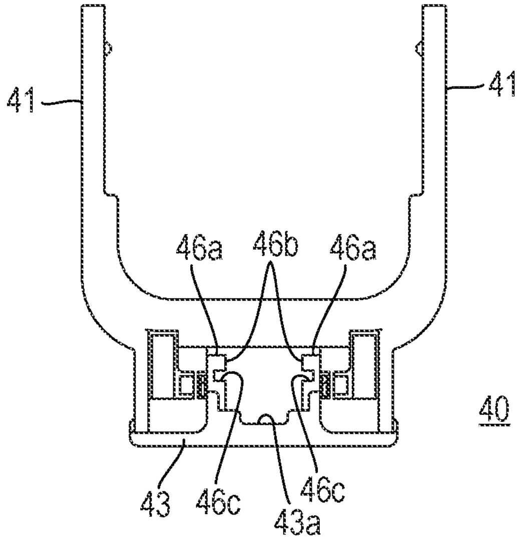
FIG. 8A is a plan view of a lever.
Figure 8B:
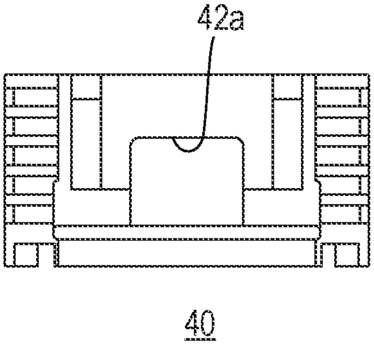
FIG. 8B is an elevational view of the lever.
Figure 8C:
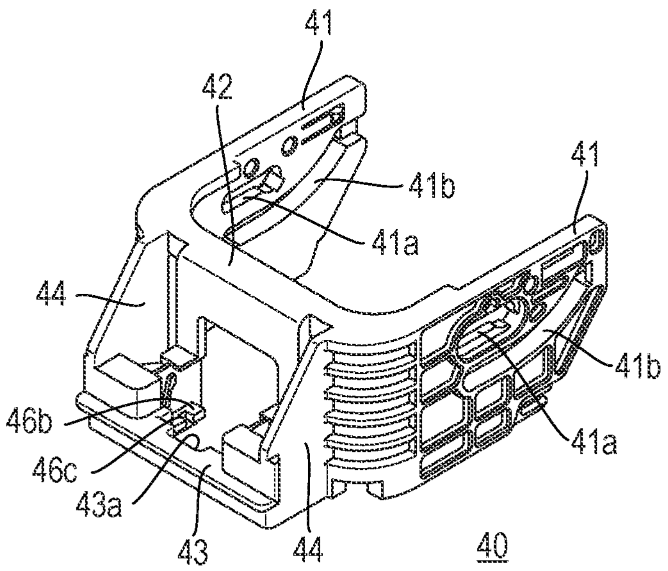
FIG. 8C is a perspective view of the lever viewed from obliquely above the front of the lever.
Figure 8D:
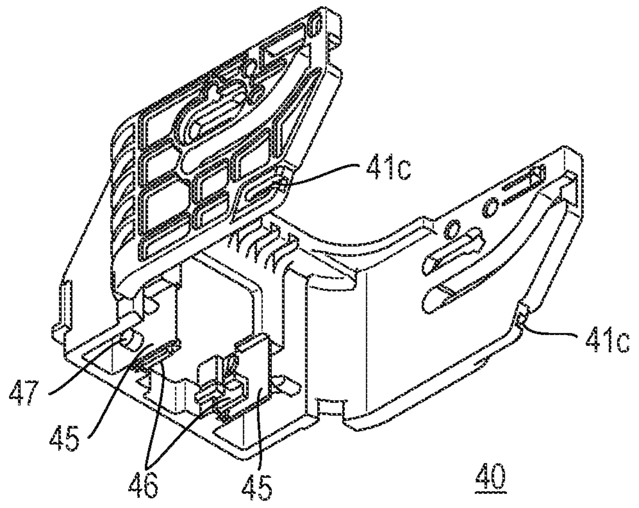
FIG. 8D is a perspective view of the lever viewed from obliquely below the back of the lever.
Figure 8E:
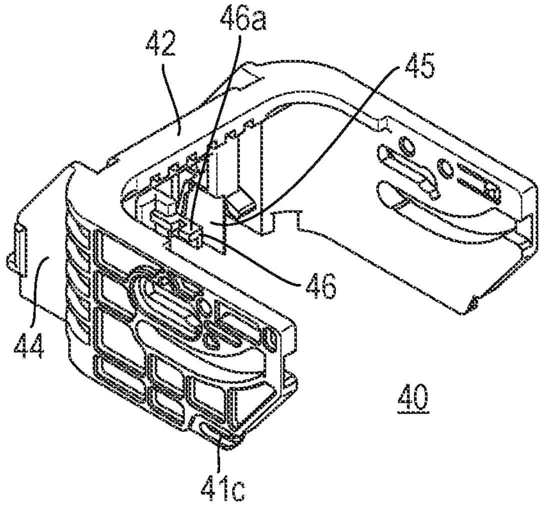
FIG. 8E is a perspective view of the lever viewed from obliquely above the back of the lever.
Figure 8F:
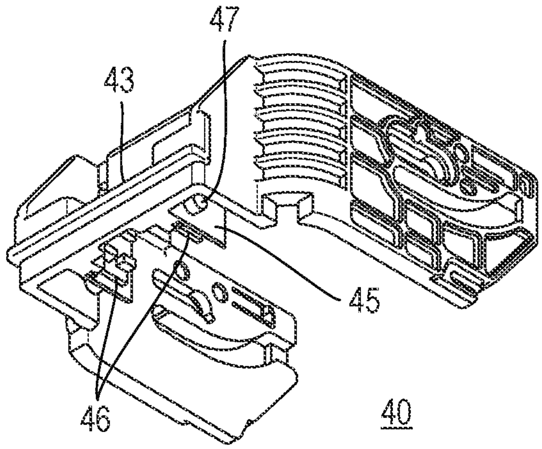
FIG. 8F is a perspective view of the lever viewed from obliquely below the front of the lever.
Figure 9A:
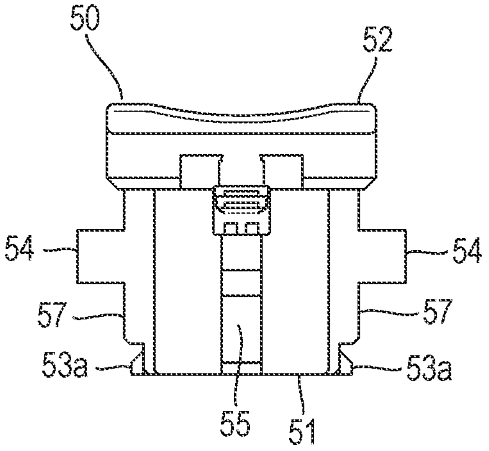
FIG. 9A is an elevational view of an interlock housing.
Figure 9B:
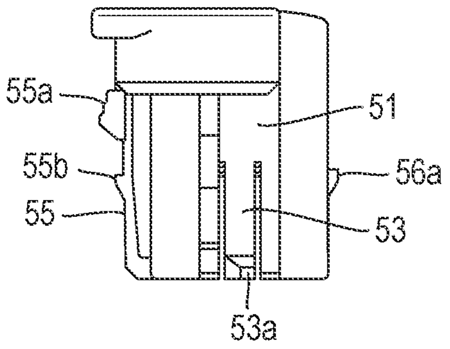
FIG. 9B is a right side view of the interlock housing.
Figure 9C:
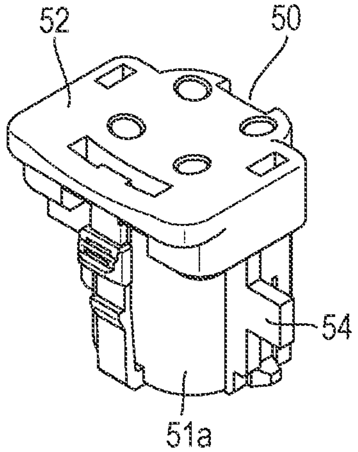
FIG. 9C is a perspective view of the interlock housing viewed from obliquely above the front of the interlock housing.
Figure 9D:
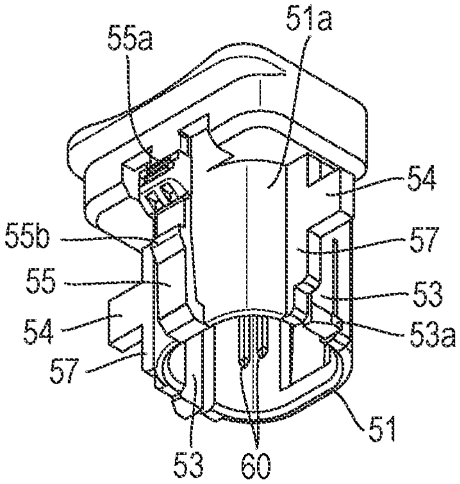
FIG. 9D is a perspective view of the interlock housing viewed from obliquely below the front of the interlock housing.
Figure 9E:
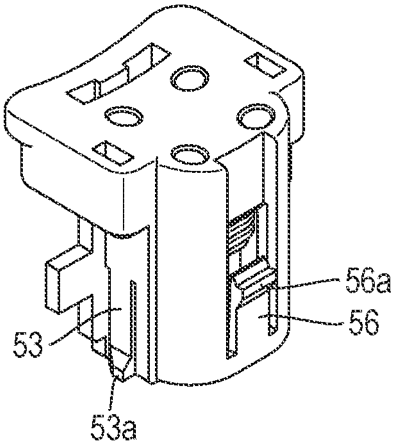
FIG. 9E is a perspective view of the interlock housing viewed from obliquely above the back of the interlock housing.

On the other hand, in FIGS. 6A, 6B, and 6C illustrating the mating connector 200, 110 denotes a mating housing and 120 denotes a mating main terminal. Further, 130 denotes a mating interlock terminal. The mating connector 200 is to be mounted on a substrate.

The mating housing 110 includes a plate portion 111 and a fitted portion 112. The fitted portion 112 has a frame shape opening upward and is positioned on the plate portion 111 in a protruding manner. On portions positioned on the left and right in an outer surface of a circumferential wall 112*a*, having a frame shape, of the fitted portion 112, driven bosses 113 are formed in a pair in a manner to protrude mutually outward. Further, a rearward facing portion of the circumferential wall 112*a* is largely cut with a cutout 114. A pair of mating main terminals 120 is housed and positioned in the inside of the fitted portion 112.

On the plate portion 111 of the mating housing 110, an attaching portion 115, a pair of holding portions 116, and a pair of holding portions 117 are further formed. The attaching portion 115 is positioned on the front side of the fitted portion 112 and has a cylindrical shape opening upward. The mating interlock terminals 130 are attached and fixed in the attaching portion 115.

The holding portions 116 are provided in a pair on the left and the right of the attaching portion 115 in front of the fitted portion 112. The holding portion 116 has a shape in which an eaves-like portion 116*a* facing frontward is supported by an upright portion 116*b* which vertically rises from the plate portion 111. The holding portions 117 are provided in a pair on the left and the right of the fitted portion 112 on the rear side of the fitted portion 112. The holding portion 117 has a plate surface orthogonal to the plate portion 111. On the plate surfaces of the pair of holding portions 117, protrusions 117*a* are formed in a manner to protrude mutually inward.

A fitting operation between the connector 100 and the mating connector 200, which are described above, will now be described.

FIGS. 10, 11, 12, and 13 illustrate respective states 1 to 4 in the fitting process between the connector 100 and the mating connector 200 in order, and FIGS. 14A and 14B, FIGS. 15A, 15B, and 15C, FIGS. 16A, 16B, and 16C, and FIGS. 17A, 17B, 17C, and 17D illustrate details of principal portions in the respective states 1 to 4.

Figure 10:
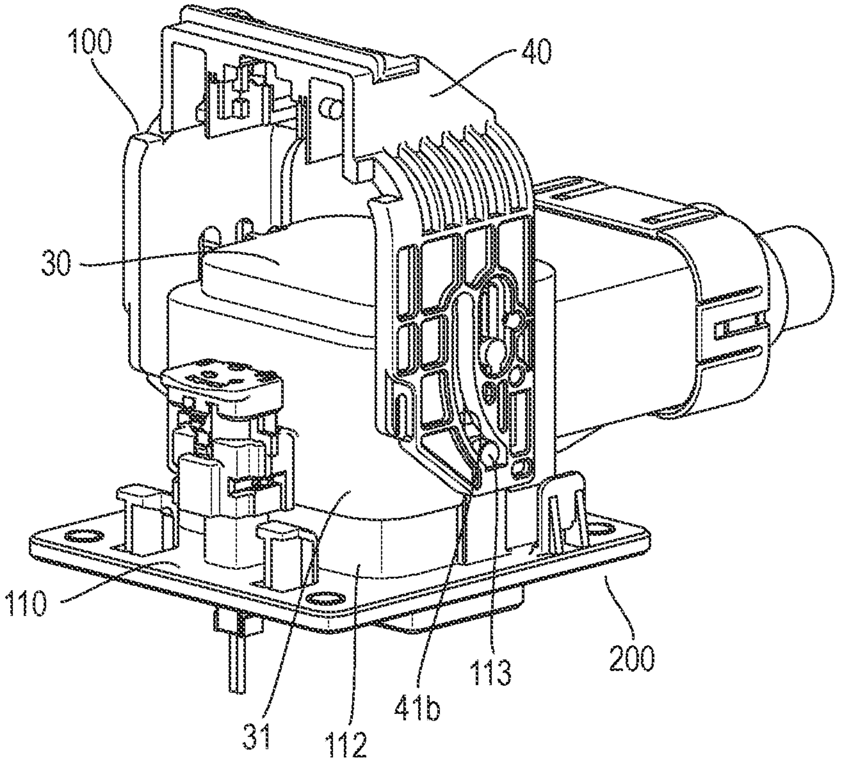
FIG. 10 is a perspective view illustrating a state of the connector device according to the first embodiment whose lever is on a first position (that is, a fitting preparation position of the connector).
Figure 11:
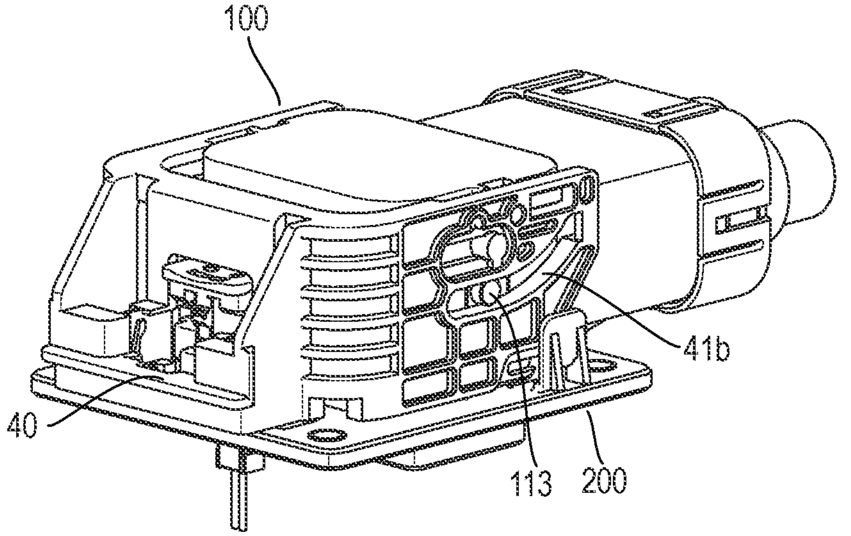
FIG. 11 is a perspective view illustrating a state of the connector device according to the first embodiment whose lever is on a second position.
Figure 12:
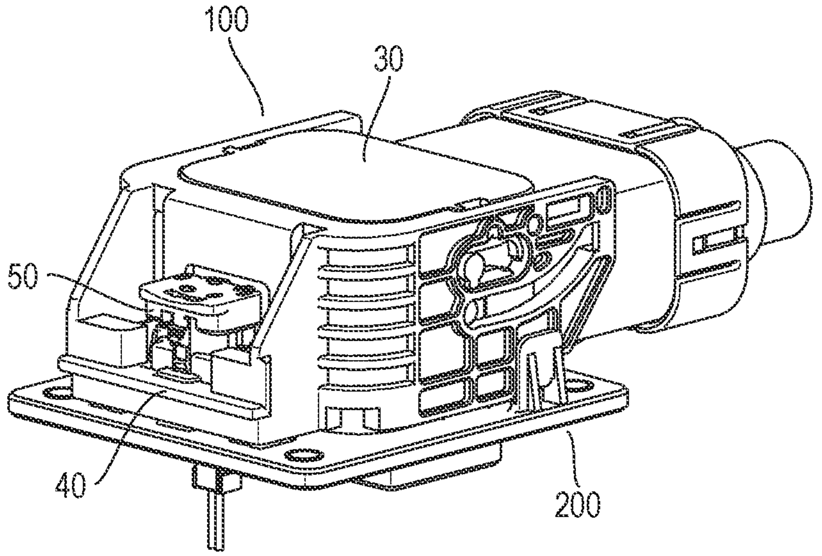
FIG. 12 is a perspective view illustrating a state of the connector device according to the first embodiment whose lever is on a third position.
Figure 13:
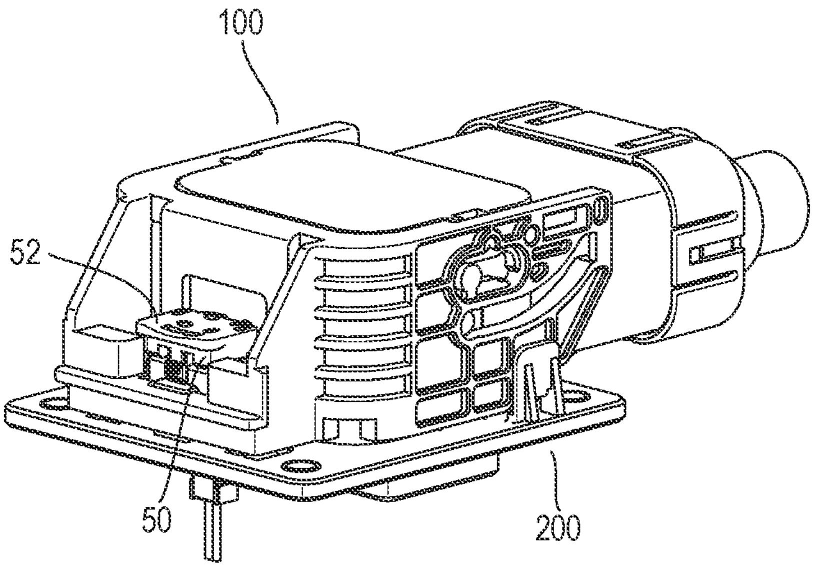
FIG. 13 is a perspective view illustrating a state of the connector device according to the first embodiment whose interlock housing is on a closing position.
Figure 14A:
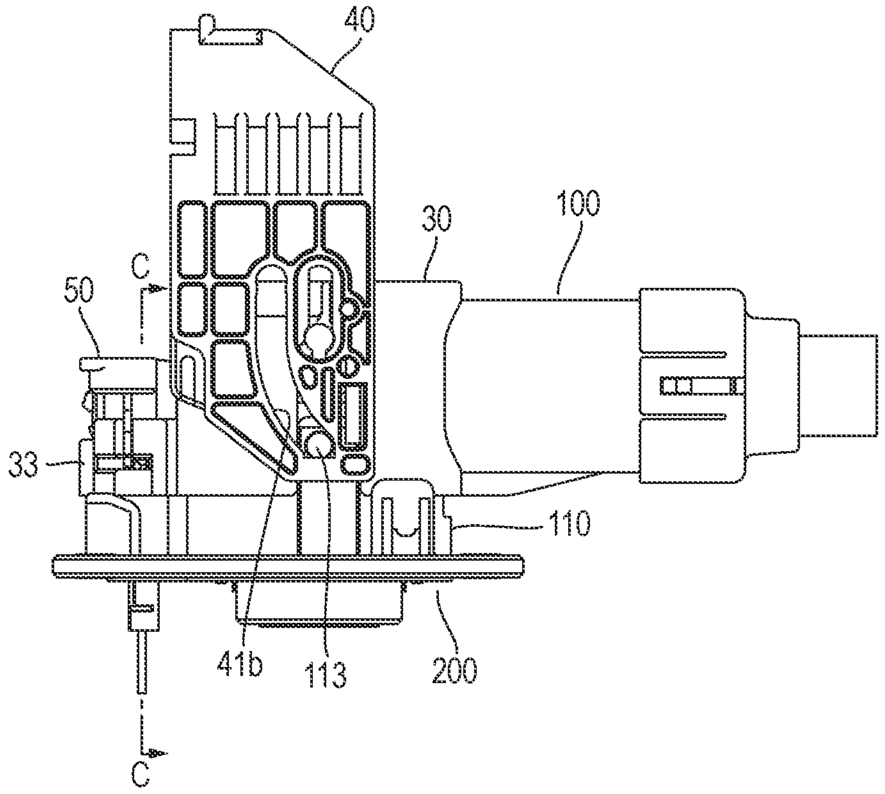
FIG. 14A is a right side view of the state illustrated in FIG. 10.
Figure 14B:
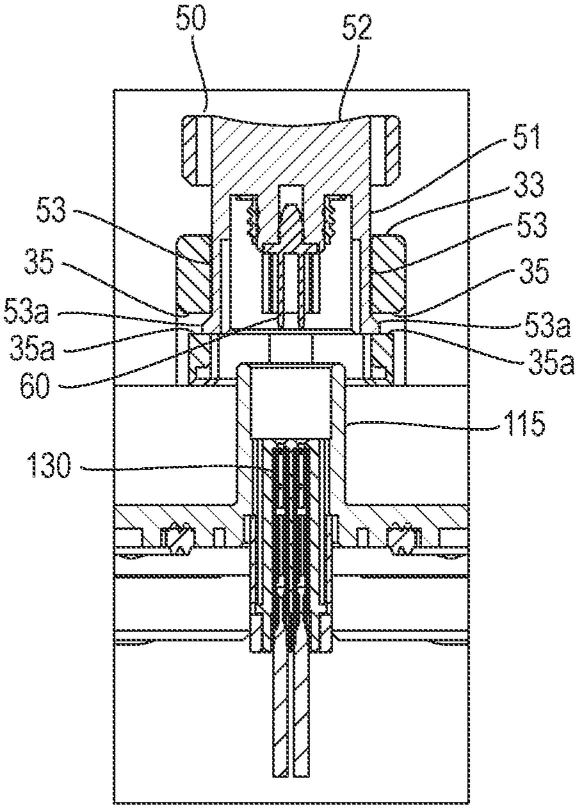
FIG. 14B is a partially enlarged view of a section taken along a C-C line of FIG. 14A.

State 1: FIGS. 10, 14A, and 14B

In the state 1, the fitting portion 31 of the housing 30 of the connector 100, whose lever 40 is positioned on the first position, is fitted to the fitted portion 112 of the mating housing 110 of the mating connector 200 and thus, the connector 100 is on a fitting preparation position with respect to the mating connector 200. The driven bosses 113, provided in a pair, of the mating connector 200 are inserted in respective cam grooves 41*b* of the lever 40 in the connector 100. In the state 1, the main terminals 70 and the mating main terminals 120 are not connected with each other yet.

In the interlock housing 50 that is attached to the attaching portion 33 of the housing 30 in the connector 100, the protrusion portions 53*a* of the pair of spring pieces 53 are positioned on natural positions in a manner to be in the respective slits 35 of the attaching portion 33 as illustrated in FIG. 14B. Accordingly, the interlock housing 50 cannot be pressed down even though the operation portion 52 thereof is pressed because the protrusion portions 53*a* are abutted on abutting surfaces 35*a*, which are lower inner surfaces of the slits 35, that is, sliding to a closing position, on which the interlock terminals 60 of the connector 100 and the mating interlock terminals 130 of the mating connector 200 are mutually connected, is blocked.

State 2: FIGS. 11, 15A, 15B, and 15C

Figure 15A:
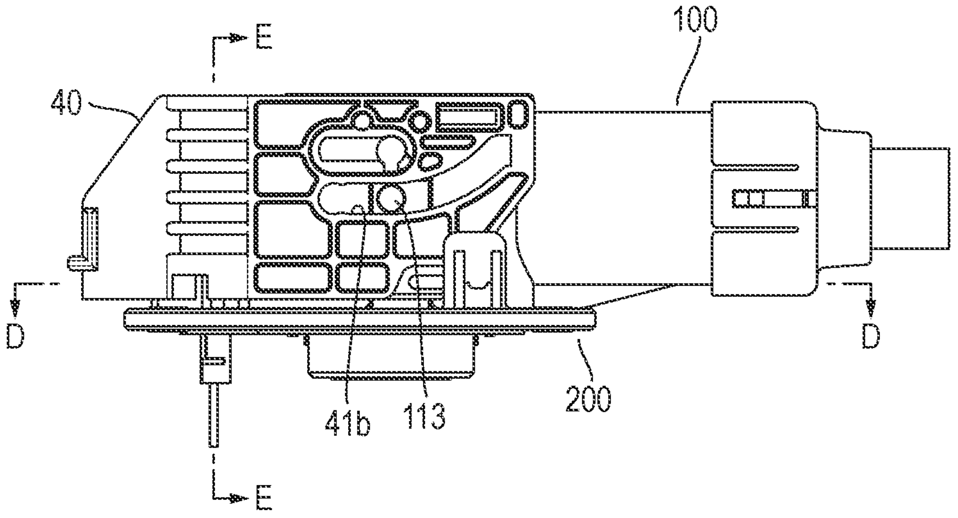
FIG. 15A is a right side view of the state illustrated in FIG. 11.
Figure 15B:
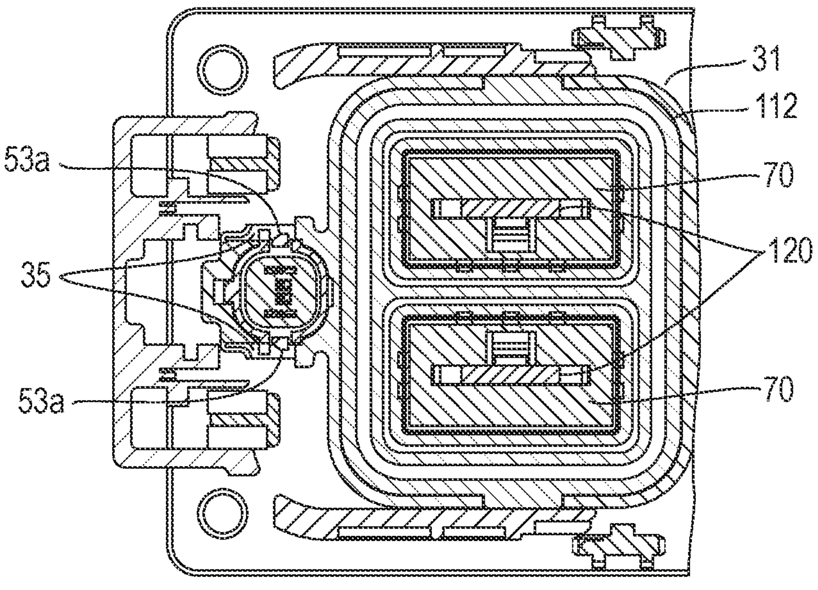
FIG. 15B is a partially enlarged view of a section taken along a D-D line of FIG. 15A.

The state 2 is a state in which the lever 40 is rotated from the first position to the second position. The connector 100 is drawn to a fitting position, which is closer to the mating connector 200 than the fitting preparation position of the state 1, by a cam mechanism to be in the state 2. The cam mechanism is composed of the cam grooves 41*b* of the lever 40 and the driven bosses 113, which are inserted in the cam grooves 41*b*, of the mating connector 200. The main terminals 70 of the connector 100 and the mating main terminals 120 of the mating connector 200 are connected with each other in the state 2, as illustrated in FIG. 15B.

Figure 15C:
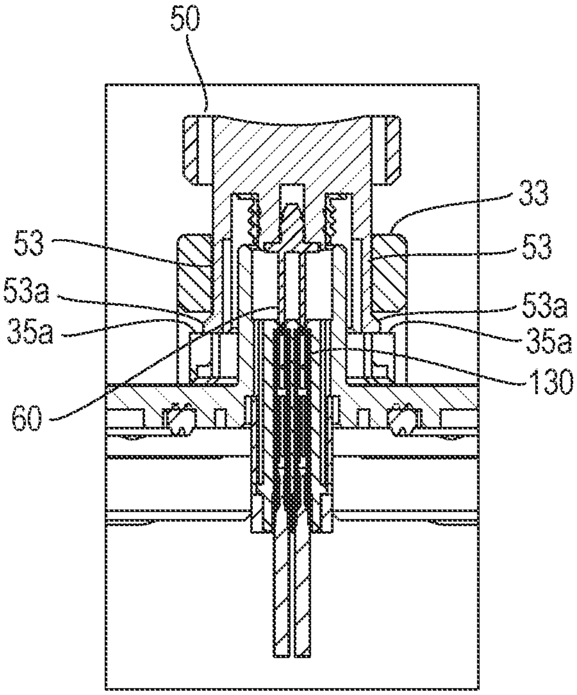
FIG. 15C is a partially enlarged view of a section taken along an E-E line of FIG. 15A.

The interlock housing 50 is on an opening position of the state 1 as in the state 1 and the protrusion portions 53*a* of the spring pieces 53 are on natural positions. The sliding of the interlock housing 50 to the closing position is blocked and even though the connector 100 is brought closer to the mating connector 200, the interlock terminals 60 and the mating interlock terminals 130 are not connected with each other yet and are still disconnected from each other, as illustrated in FIG. 15C.

When the lever 40 is rotated from the second position to the first position in a state in which the connector 100 whose lever 40 is on the second position is on the fitting position of the state 2 with respect to the mating connector 200, the connector 100 is pushed back to the fitting preparation position of the state 1 by the cam mechanism and accordingly, the connection between the main terminals 70 and the mating main terminals 120 is released.

State 3: FIGS. 12, 16A, 16B, and 16C

Figure 16A:
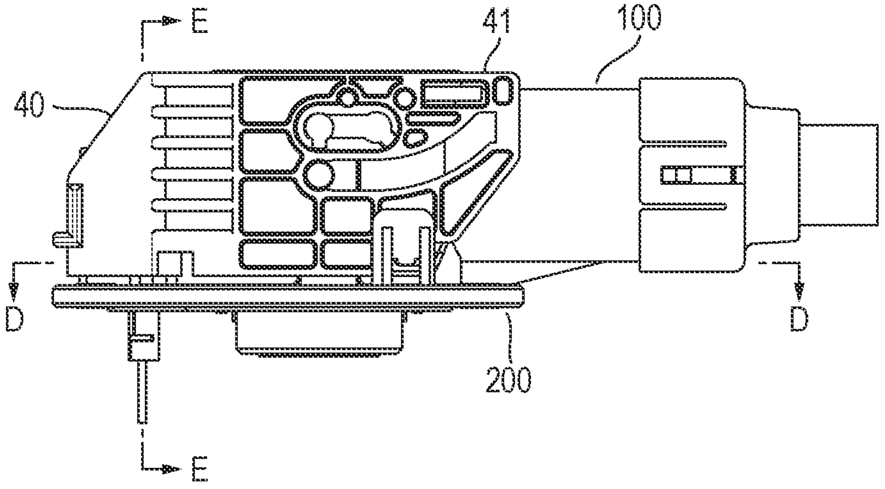
FIG. 16A is a right side view of the state illustrated in FIG. 12.
Figure 16B:
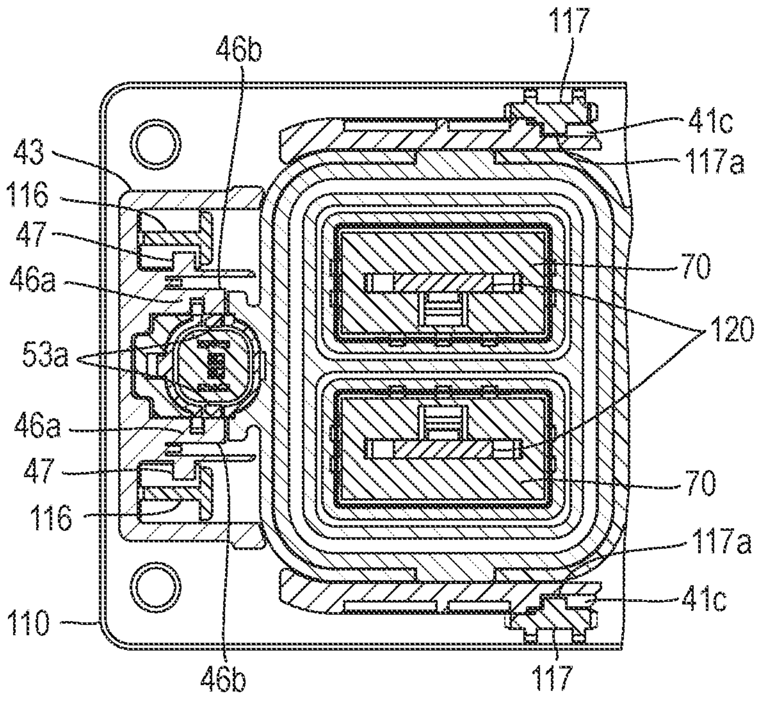
FIG. 16B is a partially enlarged view of a section taken along a D-D line of FIG. 16A.
Figure 16C:
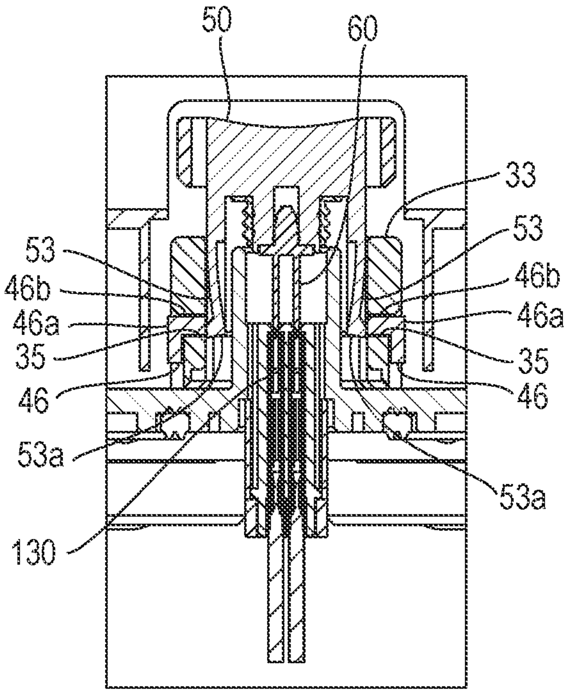
FIG. 16C is a partially enlarged view of a section taken along an E-E line of FIG. 16A.

The state 3 is a state in which the lever 40 is slid from the second position to the third position and the slide insertion portions 46*a* of the pair of protruding portions 46 of the lever 40 enter the slits 35 of the housing 30. Accordingly, the protrusion portions 53*a* of the pair of spring pieces 53 of the interlock housing 50 are pressed by the pressing portions 46*b* on the ends of the slide insertion portions 46*a*, being displaced from the natural positions to retracted positions, as illustrated in FIG. 16B. The displacement of the protrusion portions 53*a* to the retracted positions enables the interlock housing 50, which is attached to the attaching portion 33 of the housing 30 in a manner to be able to slide between the opening position and the closing position, on which the interlock housing 50 is to be positioned, to slide to the closing position.

The lever 40 becomes to be able to slide when the slide insertion portions 46*a* enter the slits 35 of the housing 30. Accordingly, when the lever 40 is not on the second position of the state 2 or is not completely rotated (completely laid), for example, the slide insertion portions 46*a* cannot enter the slits 35 or the lever 40 cannot be slid to the third position.

Because of such a configuration in which the slide insertion portions 46*a* of the lever 40 enter the slits 35 of the housing 30, the lever 40 cannot rotate in the state 3 in which the lever 40 is on the third position.

In addition to this, in the state 3 in which the lever 40 is on the third position, the protrusions 117*a* of the holding portions 117, provided to the mating connector 200, enter the held portions 41*c*, provided to the pair of arm portions 41 and having a concave portion shape, and further, the held portions 47, provided in a pair to the operation portion 43 of the lever 40 and having the shaft shape, go under the respective eaves-like portions 116*a* of the holding portions 116, provided to the mating connector 200, in this example, as illustrated in FIG. 16B. Accordingly, the held portions 41*c* and 47 are held by the holding portions 117 and 116 respectively and the lever 40 is firmly fixed to the mating housing 110 of the mating connector 200.

State 4: FIGS. 13, 17A, 17B, 17C, and 17D

The state 4 is a state in which the interlock housing 50, which is positioned on the opening position in the state 3, is pressed along with pressing of the operation portion 52 and slid to be positioned on the closing position. In the state 4, the interlock terminals 60 and the mating interlock terminals 130 are mutually connected as illustrated in FIG. 17D. Consequently, fitting is detected.

Figure 17A:
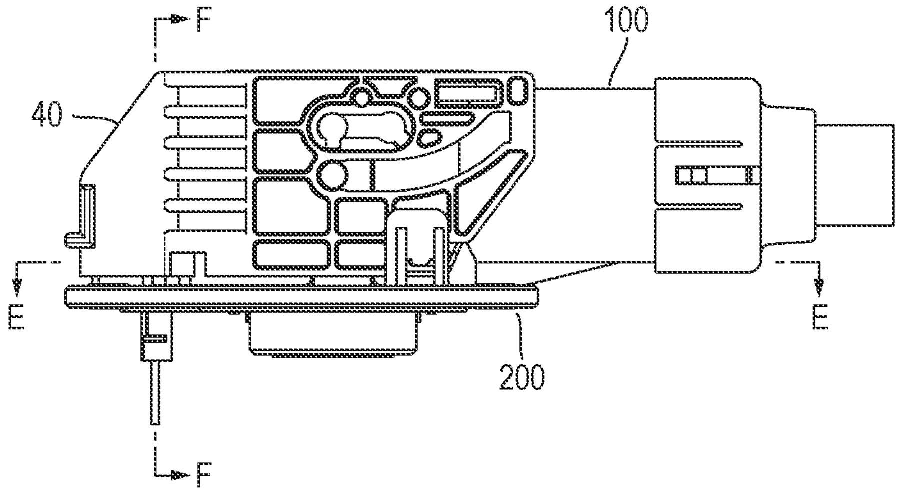
FIG. 17A is a right side view of the state illustrated in FIG. 13.
Figure 17B:
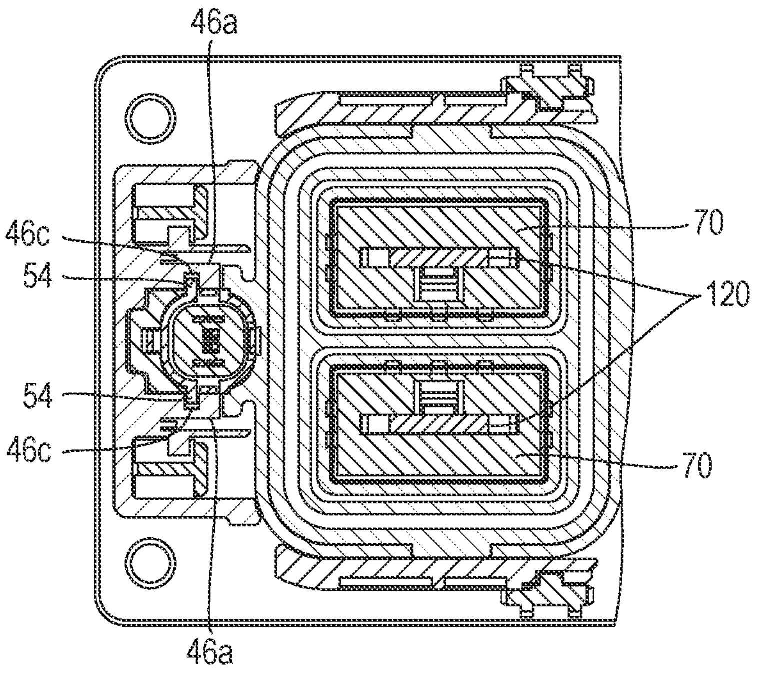
FIG. 17B is a partially enlarged view of a section taken along an E-E line of FIG. 17A.

In the state in which the interlock housing 50 is pressed down to be positioned on the closing position, the lever slide blocking portions 54, provided in a pair to the interlock housing 50, enter the blocked portions 46*c*, formed by cutting with the slide insertion portions 46*a* of the lever 40, as illustrated in FIG. 17B. Accordingly, the lever 40 is fixed on the third position and cannot slide, that is, sliding to the second position is blocked.

Figure 17C:
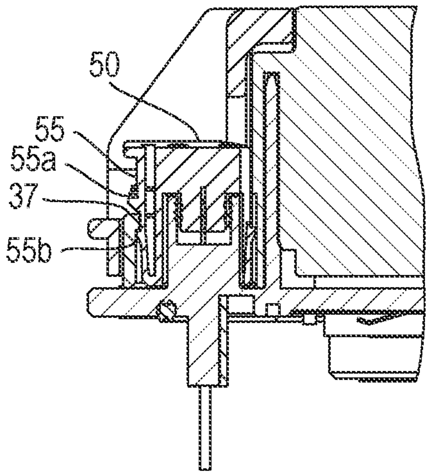
FIG. 17C is a partially enlarged view of a central longitudinal section of FIG. 17A.
Figure 17D:
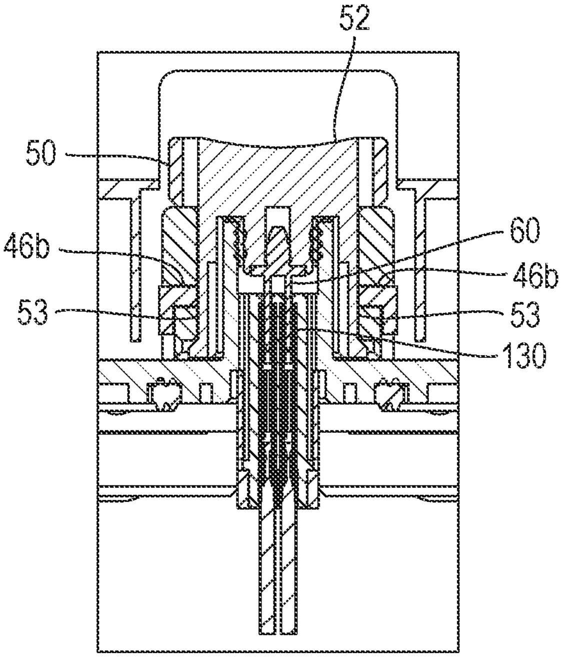
FIG. 17D is a partially enlarged view of a section taken along an F-F line of FIG. 17A.

The protrusion 55*b* of the locking piece 55 is caught and engaged with an engaging portion 37 that is provided on the attaching portion 33 of the housing 30 and accordingly, the interlock housing 50 positioned on the closing position is locked on the closing position, as illustrated in FIG. 17C. Unlocking is performed by pressing the operation protrusion portion 55*a* of the locking piece 55, enabling the interlock housing 50 to slide-return to the opening position and enabling the lever 40 to slide-return to the second position.

The configuration and the fitting operation of the connector device according to the first embodiment that is composed of the connector 100 and the mating connector 200 have been described above. A circuit device that supplies large current between the main terminals 70 and the mating main terminals 120 is provided on the outside of the connector device when the main terminals 70 for large current and the mating main terminals 120 are connected with each other and the interlock terminals 60 for HVILs and the mating interlock terminals 130 are connected with each other to close the HVIL circuit.

According to the connector device of the first embodiment described above, the following advantageous effects can be obtained.

(1) In this example, the connection and disconnection of the HVILs is performed by pressing down and pulling up the interlock housing 50 that is provided separately from the lever 40. That is, the connection of the HVILs is performed in a manner such that after the main terminals 70 and the mating main terminals 120 are mutually connected through the rotation operation of the lever 40, the sliding operation of the lever 40 is performed and further, the interlock housing 50 is pressed down. Meanwhile, the disconnection between the main terminals 70 and the mating main terminals 120 is performed in a manner such that after the HVILs are mutually disconnected by pulling up the interlock housing 50, the sliding operation of the lever 40 is performed and further, the rotation operation of the lever 40 is performed.

Thus, compared to a conventional connector device in which connection and disconnection of terminals for large current and connection and disconnection of HVILs are performed only by a lever operation which is rotation and sliding of a lever, this example requires an additional step of pressing down or pulling up the interlock housing 50 between the connection or disconnection of main terminals for large current and the connection or disconnection of HVILs, providing a larger time interval between these two.

Accordingly, even if an operator gets used to a fitting operation and a separation operation of the connector device and starts performing the operations fast, the connection or disconnection of main terminals for large current and the connection or disconnection of HVILs are performed with a sufficient time interval therebetween, being able to enhance safety in the fitting and separation work of the connector device compared to the related art.

(2) The lever 40 cannot be slid unless the lever 40 is completely rotated to the second position. Thus, the HVILs are not mutually connected in an imperfect state in connection between the main terminals 70 and the mating main terminals 120 (imperfect state in fitting of the connector 100). Further, the impossible state in sliding the lever 40 informs an operator that the connector 100 is not positioned on the fitting position and the fitting is imperfect.

(3) The work in which the interlock housing 50 is pressed down and positioned on the closing position to connect HVILs can be performed in a state in which the lever 40 is rotated and slid to be positioned on the third position (the state 3), and the interlock housing 50 cannot be pressed down in the previous states (the states 1 and 2).

(4) When the lever 40 is slid to be positioned on the third position, the lever 40 cannot rotate in a reverse direction and the connector 100 is positioned on the fitting position, whereby the fitting to the mating connector 200 is locked. Further, when the lever 40 is slid to be positioned on the third position, the held portions 41*c* and 47 provided to the lever 40 are firmly held by the holding portions 116 and 117 of the mating connector 200, being able to prevent the lever 40 from coming off or being rubbed and worn due to vibration, for example.

(5) When the interlock housing 50 is pressed down to be positioned on the closing position, the lever slide blocking portions 54 of the interlock housing 50 enter the blocked portions 46*c* of the lever 40, blocking the sliding of the lever 40 to the second position. That is, fitting detection by the HVILs and locking of the lever 40, namely, connector position assurance (CPA) can be performed through one action which is pressing down the interlock housing 50. Accordingly, a component for the CPA function does not have to be separately provided, being able to reduce the number of components.

Second Embodiment

FIGS. 18A and 18B and FIGS. 19A, 19B, 19C, and 19D respectively illustrate a connector 400 and a mating connector 500 constituting a connector device according to a second embodiment. In respective components of the connector 400 and the mating connector 500, portions corresponding to those of the first embodiment will be provided with the same reference characters and detailed description thereof will be omitted.

In this example, the lever 40 of the connector 400 rotates in a reverse direction to the first embodiment, that is, the lever 40 rotates in a direction approaching the cables 300.

The housing 30 of the connector 400 is composed of the fitting portion 31, the cable housing portion 32, and the attaching portion 33 as illustrated in FIGS. 20A, 20B, 20C, and 20D. On respective lateral surfaces of the fitting portion 31, the guide shafts 34 are formed in a pair.

The attaching portion 33 to which the interlock housing 50 is to be attached is provided on one lateral surface on the base end side (an end portion closer to the fitting portion 31) of the cable housing portion 32, and the attaching portion 33 is composed of a concave portion 38 that is formed on the lateral surface of the cable housing portion 32 and a frame portion 39 that forms a space, opening in the vertical direction, with the concave portion 38 in between.

The frame portion 39 is formed from the cable housing portion 32 to the fitting portion 31. In the middle in the vertical direction of the frame portion 39, the slit 35 extending in the front-back direction of the frame portion 39 is formed. Further, in the middle in the front-back direction of the frame portion 39, the slit 36 extending in the vertical direction to divide the frame portion 39 into two is formed in a manner to intersect with the slit 35.

The lever 40 of the connector 400 includes the pair of arm portions 41 and the coupling portion 42 that couples the arm portions 41 provided in a pair, as illustrated in FIGS. 21A, 21B, 21C, and 21D. In this example, the coupling portion 42 serves as an operation portion for operating the lever 40. On each of the arm portions 41 provided in a pair, the guide groove 41*a* and the cam groove 41*b* are formed.

On the inner surface of one arm portion 41, the slide insertion portion 46*a* is formed in a protruding manner. One end, positioned closer to the coupling portion 42, of the slide insertion portion 46*a* is raised and this portion functions as the pressing portion 46*b*. Further, there is a portion which is completely cut out with a cutout on the other end side of the slide insertion portion 46*a* and this cut out portion functions as the blocked portion 46*c*.

The interlock housing 50 of the connector 400 includes the cylindrical portion 51, which is flattened, and the operation portion 52, positioned on the upper end of the cylindrical portion 51, as illustrated in FIGS. 22A, 22B, 22C, 22D, and 22E. The upper end side of the cylindrical portion 51 is solid in this example. Further, there is a stepped portion 58 on one lateral surface of the cylindrical portion 51, and the upper portion from the stepped portion 58 has a larger cross section than the lower portion. The interlock terminals 60 are attached and fixed in the inside of the cylindrical portion 51.

On the cylindrical portion 51, a single spring piece 53 and a single lever slide blocking portion 54 are formed in this example. The spring piece 53 is formed in a protruding manner on the lateral surface of the cylindrical portion 51. The upper end of the spring piece 53 is the base end and on the lower end (edge) thereof, the protrusion portion 53*a* is formed.

The lever slide blocking portion 54 is formed on the lateral surface of the cylindrical portion 51 in a manner to protrude in a direction that is 90° with the protruding direction of the spring piece 53. The upper end of the lever slide blocking portion 54 extending in the vertical direction is in a state coupled with the stepped portion 58.

Figure 18A:
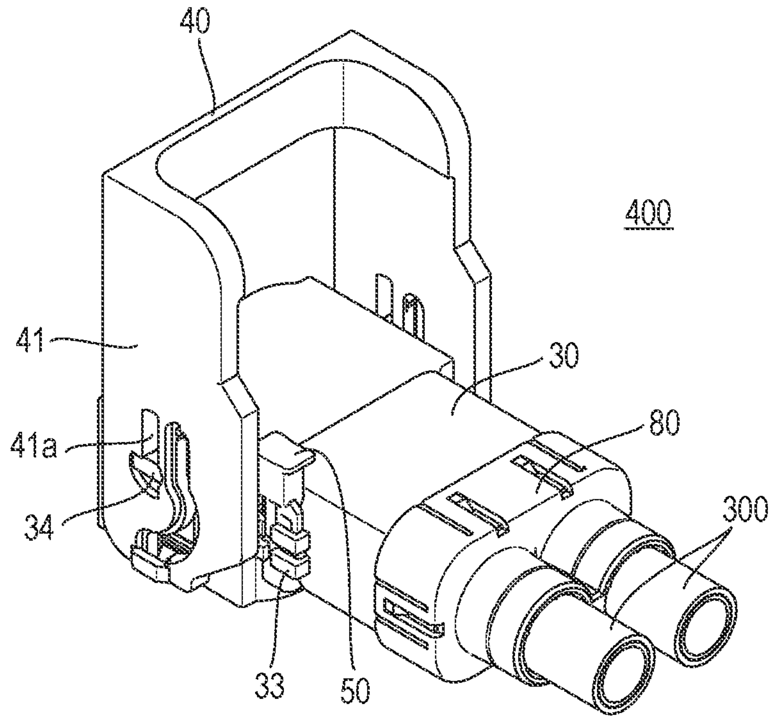
FIG. 18A is a perspective view of a connector included in a connector device according to a second embodiment viewed from obliquely above the back of the connector.
Figure 18B:
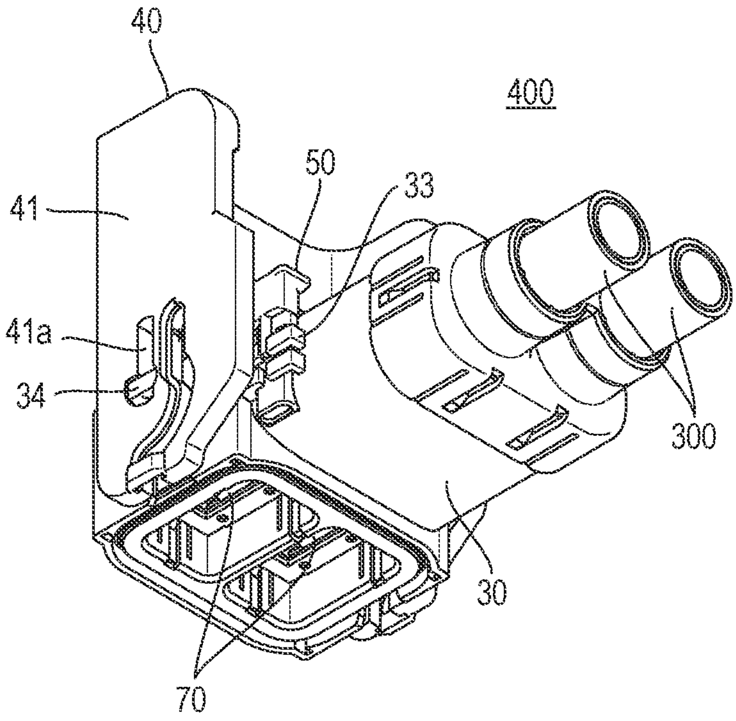
FIG. 18B is a perspective view of the connector included in the connector device according to the second embodiment viewed from obliquely below the back of the connector.
Figure 19A:
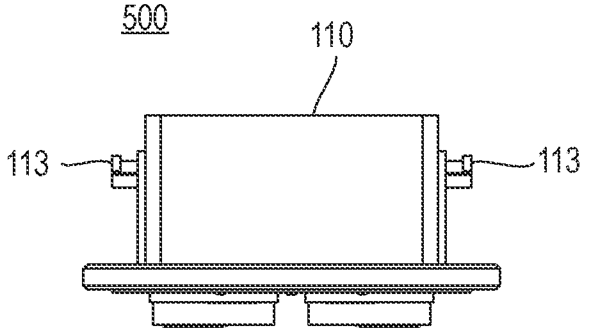
FIG. 19A is an elevational view of a mating connector included in the connector device according to the second embodiment.
Figure 19B:
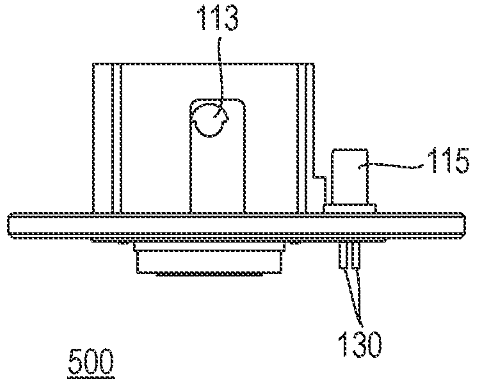
FIG. 19B is a right side view of the mating connector included in the connector device according to the second embodiment.
Figure 19C:
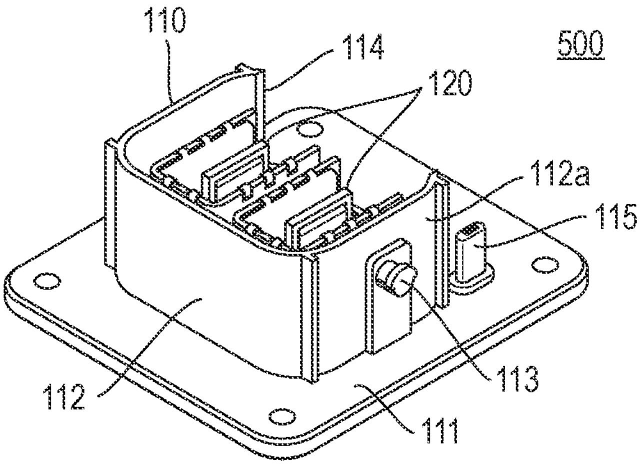
FIG. 19C is a perspective view of the mating connector included in the connector device according to the second embodiment viewed from obliquely above the front of the mating connector.
Figure 19D:
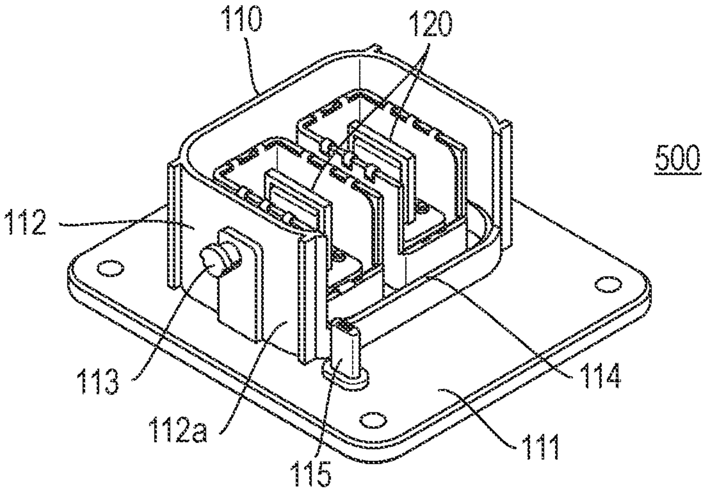
FIG. 19D is a perspective view of the mating connector included in the connector device according to the second embodiment viewed from obliquely above the back of the mating connector.
Figure 20A:
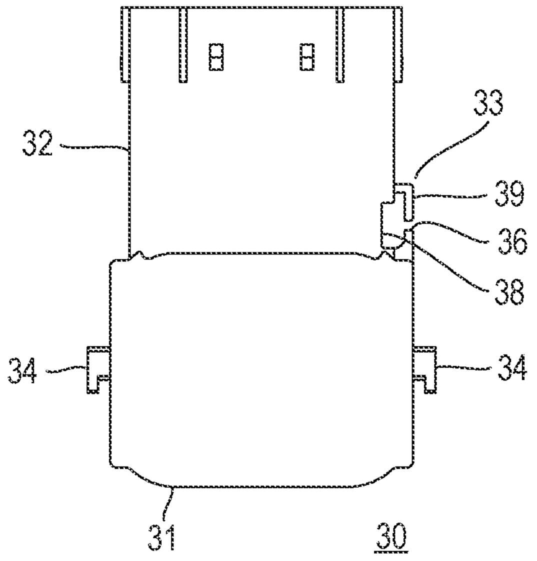
FIG. 20A is a plan view of a housing.
Figure 20B:
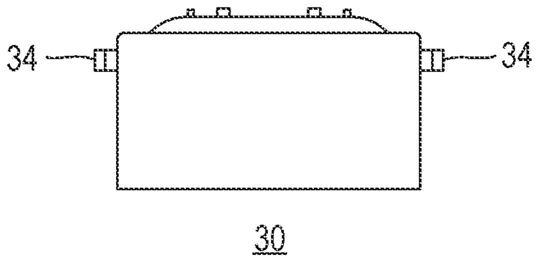
FIG. 20B is an elevational view of the housing.
Figure 20C:
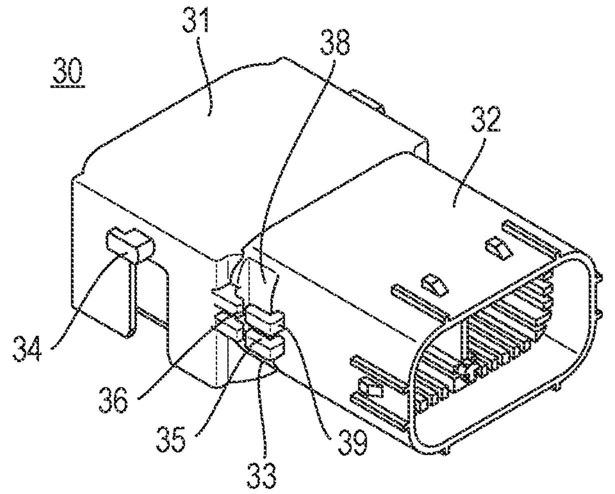
FIG. 20C is a perspective view of the housing viewed from obliquely above the back of the housing.
Figure 20D:
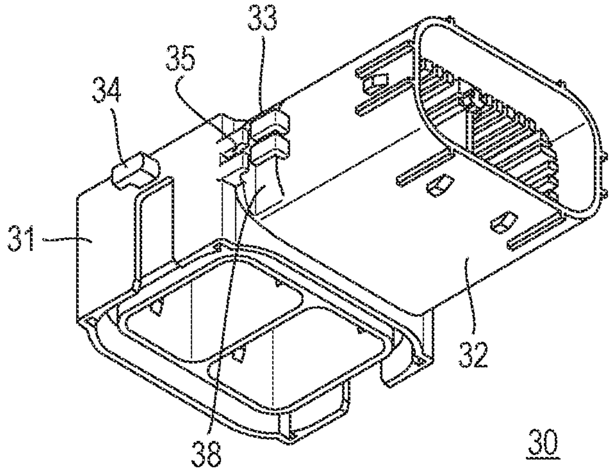
FIG. 20D is a perspective view of the housing viewed from obliquely below the back of the housing.
Figure 21A:
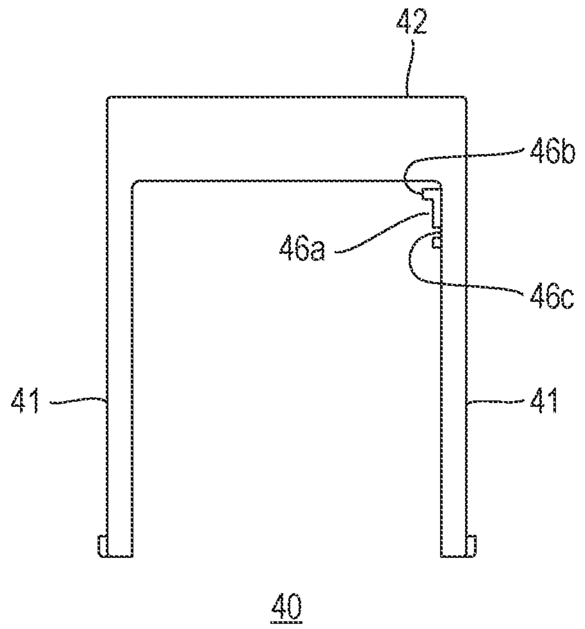
FIG. 21A is a plan view of a lever.
Figure 21B:
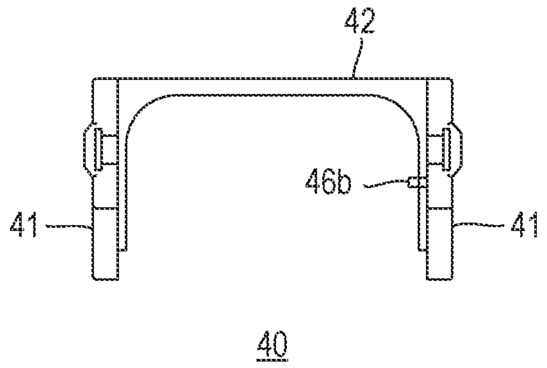
FIG. 21B is an elevational view of the lever.
Figure 21C:
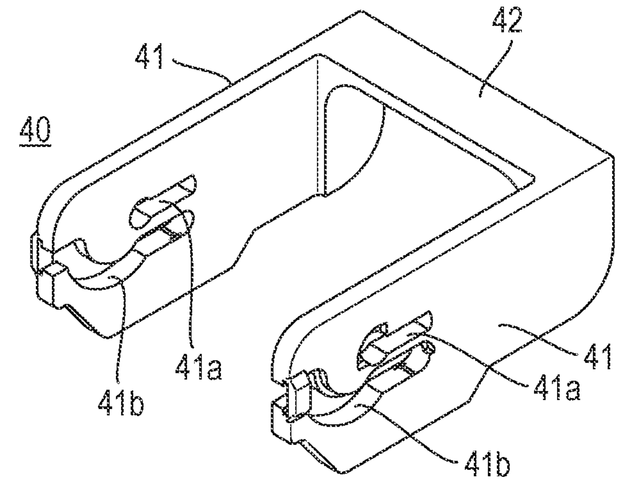
FIG. 21C is a perspective view of the lever viewed from obliquely above the front of the lever.
Figure 21D:
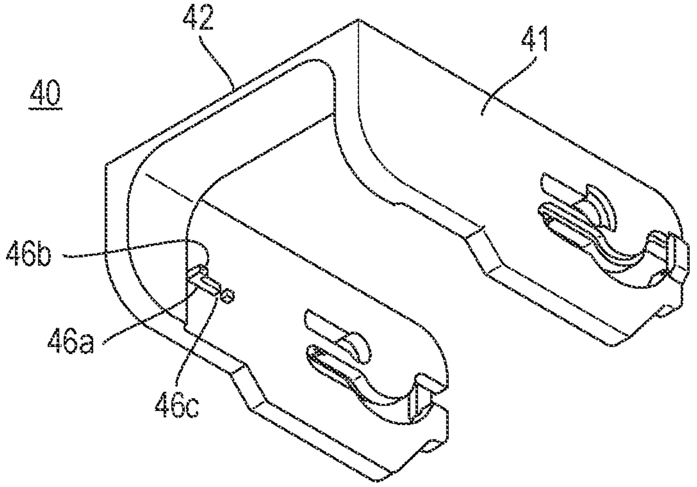
FIG. 21D is a perspective view of the lever viewed from obliquely below the back of the lever.
Figure 22A:
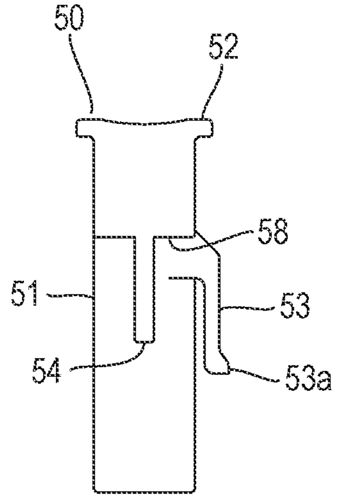
FIG. 22A is an elevational view of an interlock housing.
Figure 22B:
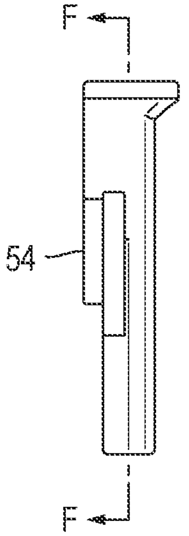
FIG. 22B is a right side view of the interlock housing.
Figure 22C:
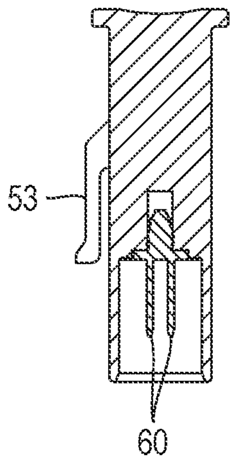
FIG. 22C is a view of an F-F line section of FIG. 22B.
Figure 22D:
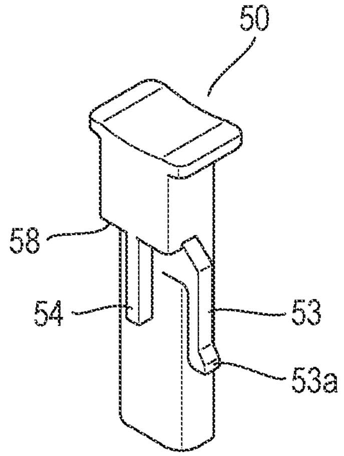
FIG. 22D is a perspective view of the interlock housing viewed from obliquely above the front of the interlock housing.
Figure 22E:
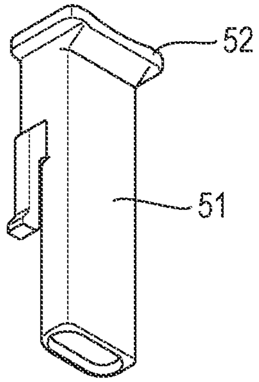
FIG. 22E is a perspective view of the interlock housing viewed from obliquely below the back of the interlock housing.

The interlock housing 50 that has the above-described configuration and holds the interlock terminals 60 is inserted from the upper side and attached to the attaching portion 33 of the housing 30. Further, the lever 40 is attached to the housing 30 in a manner such that the guide shafts 34, provided in a pair, of the housing 30 are inserted in and positioned on the respective guide grooves 41*a* of the pair of arm portions 41. The lever 40 is to be positioned on the first position, the second position, or the third position with respect to the housing 30 as is the case with the first embodiment. FIGS. 18A and 18B illustrate a state in which the lever 40 is on the first position.

The mating connector 500 is to be mounted on a substrate, and the mating housing 110 of the mating connector 500 includes the plate portion 111 and the fitted portion 112 that is positioned on the plate portion 111, as illustrated in FIGS. 19A, 19B, 19C, and 19D. On the circumferential wall 112*a* of the fitted portion 112, the pair of driven bosses 113 is formed. The pair of mating main terminals 120 is housed and positioned in the inside of the fitted portion 112.

At the rearward of the fitted portion 112, that is, on the side on which the cutout 114 formed on the circumferential wall 112*a* is positioned, the attaching portion 115 is formed on the plate portion 111 in a protruding manner. The attaching portion 115 has a cylindrical shape and the mating interlock terminals 130 are attached and fixed in the attaching portion 115.

A fitting operation between the connector 400 and the mating connector 500, which are described above, will now be described.

Figure 25A:
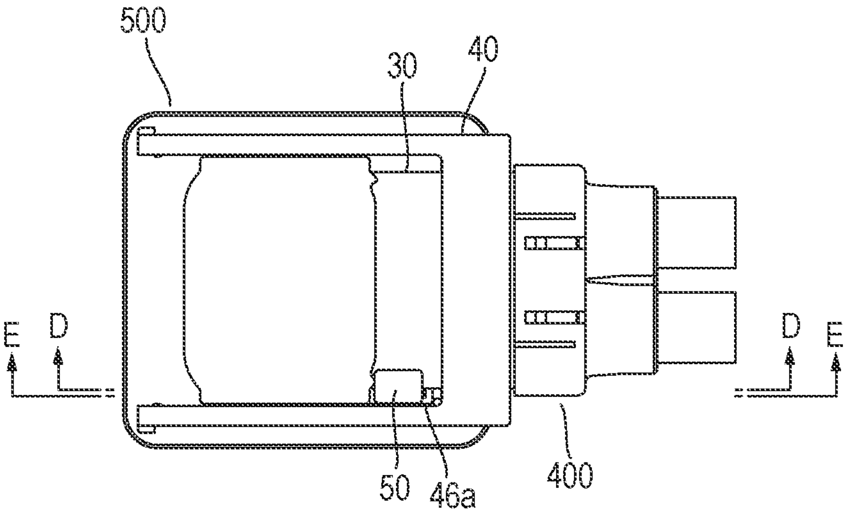
FIG. 25A is a plan view illustrating a state of the connector device according to the second embodiment whose lever is on a third position.
Figure 25B:
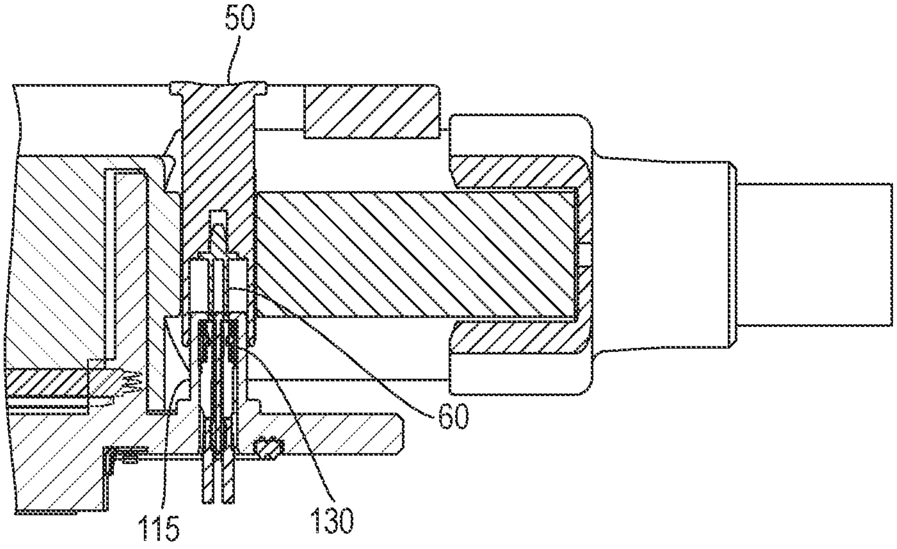
FIG. 25B is a partially enlarged view of a section taken along the D-D line of FIG. 24A.
Figure 25C:
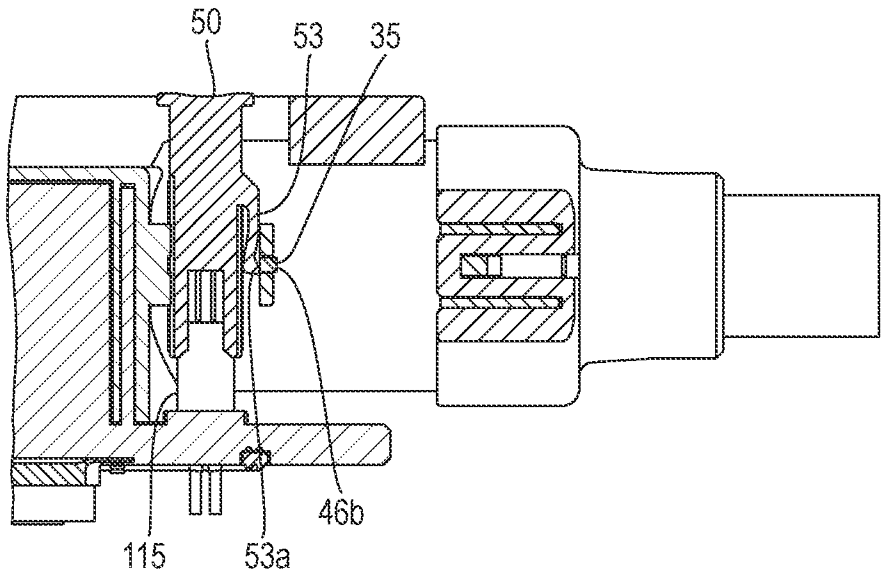
FIG. 25C is a partially enlarged view of a section taken along the E-E line of FIG. 24A.
Figure 26A:
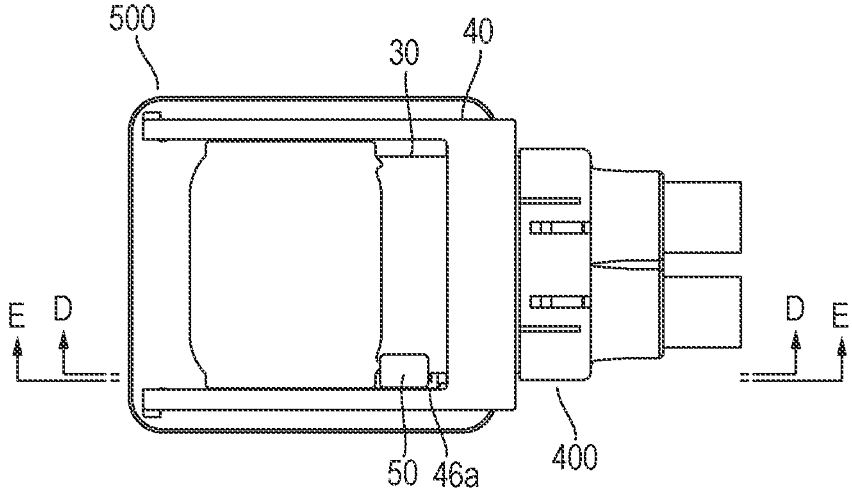
FIG. 26A is a plan view illustrating a state of the connector device according to the second embodiment whose interlock housing is on a closing position.
Figure 26B:
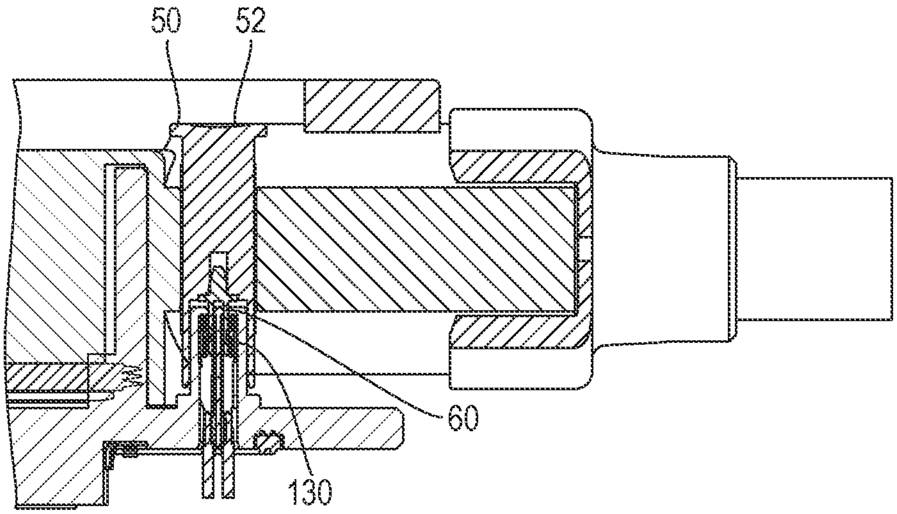
FIG. 26B is a partially enlarged view of a section taken along a D-D line of FIG. 26A.

The fitting process between the connector 400 and the mating connector 500 can be described based on four states that are states 1 to 4, as is the case with the first embodiment. FIGS. 23A and 23B, FIGS. 24A, 24B, and 24C, FIGS. 25A, 25B, and 25C, and FIGS. 26A, 26B, and 26C illustrate respective states 1 to 4 in order. FIGS. 27A, 27B, and 27C illustrate states of the slide insertion portion 46*a* of the lever 40 and the interlock housing 50, positioned on the attaching portion 33 of the housing 30, in the state 2, 3, or 4 based on a transverse section, that is, a section which is parallel to the plate portion 111 of the mating housing 110.

Figure 23A:
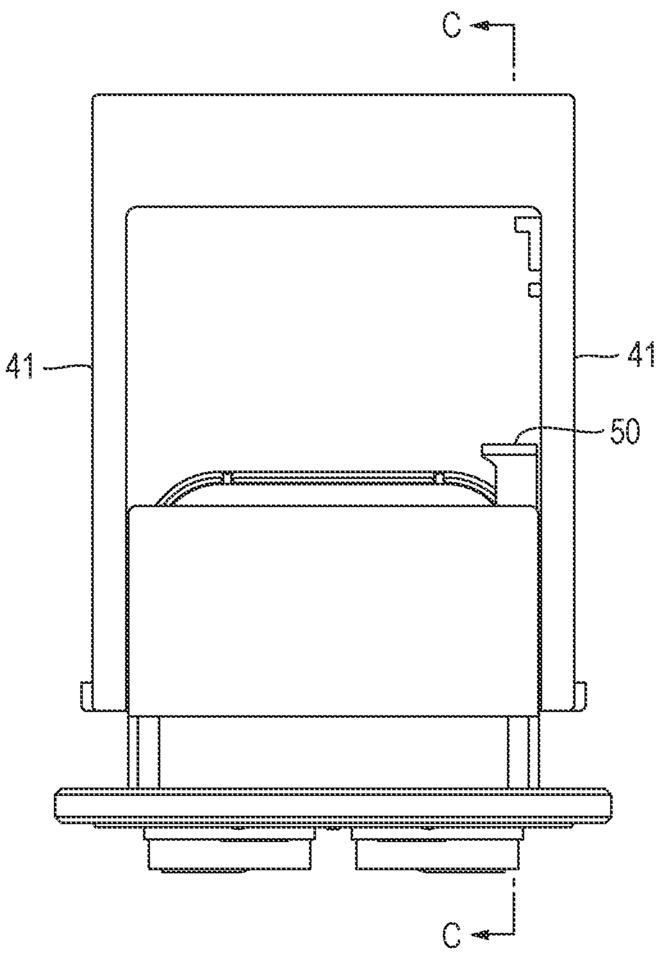
FIG. 23A is an elevational view illustrating a state of the connector device according to the second embodiment whose lever is on a first position (that is, a fitting preparation position of the connector).
Figure 23B:
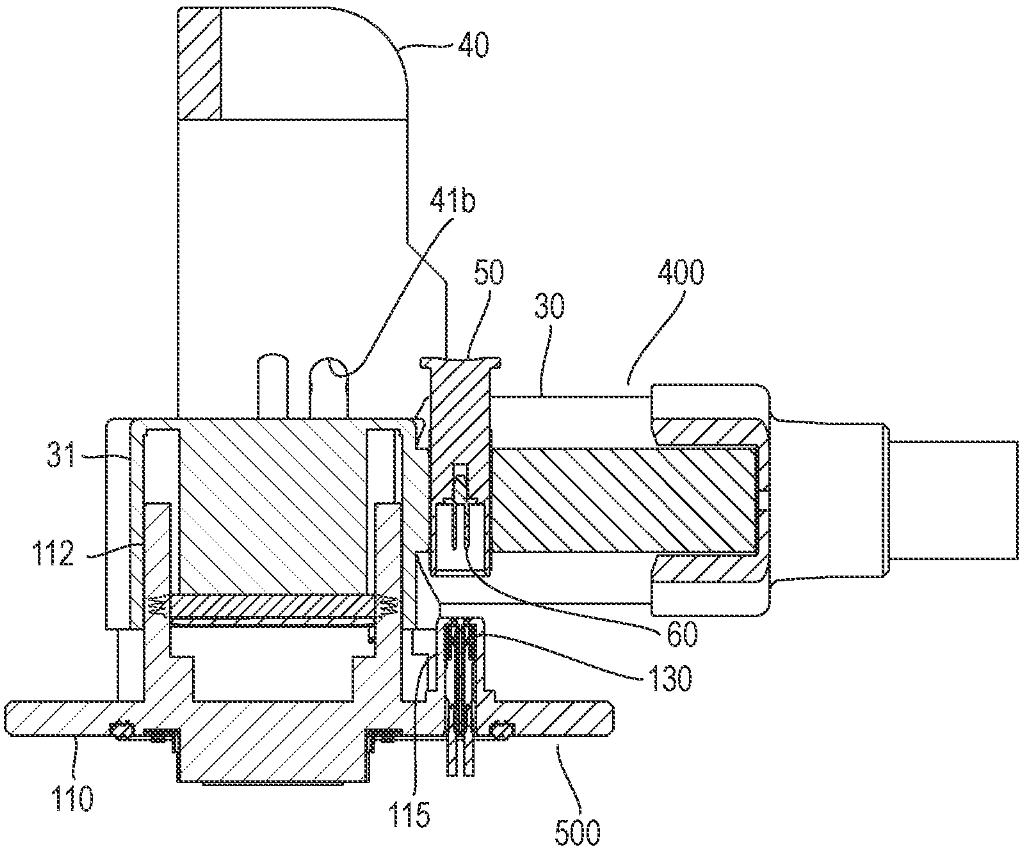
FIG. 23B is a view of a C-C line section of FIG. 23A.

State 1: FIGS. 23A and 23B

The state is shown in which the fitting portion 31 of the housing 30 of the connector 400, whose lever 40 is positioned on the first position, is fitted to the fitted portion 112 of the mating housing 110 of the mating connector 500 and thus, the connector 400 is on a fitting preparation position with respect to the mating connector 500. The driven bosses 113, provided in a pair, of the mating connector 500 are inserted in respective cam grooves 41*b* of the lever 40 in the connector 400.

Figure 24A:
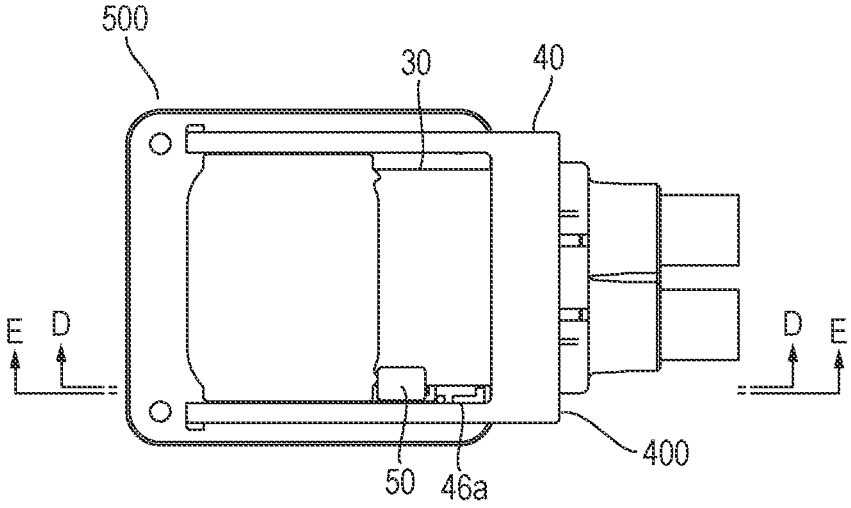
FIG. 24A is a plan view illustrating a state of the connector device according to the second embodiment whose lever is on a second position.
Figure 24B:
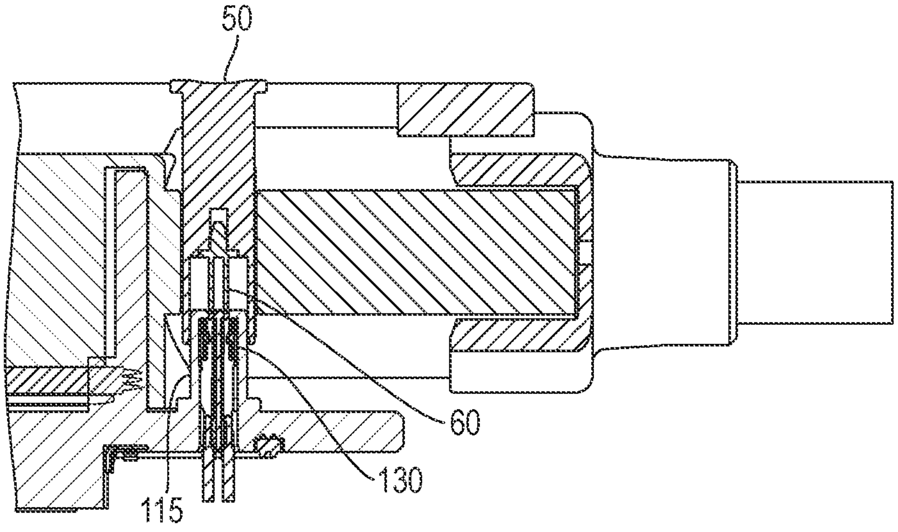
FIG. 24B is a partially enlarged view of a section taken along a D-D line of FIG. 24A.
Figure 24C:
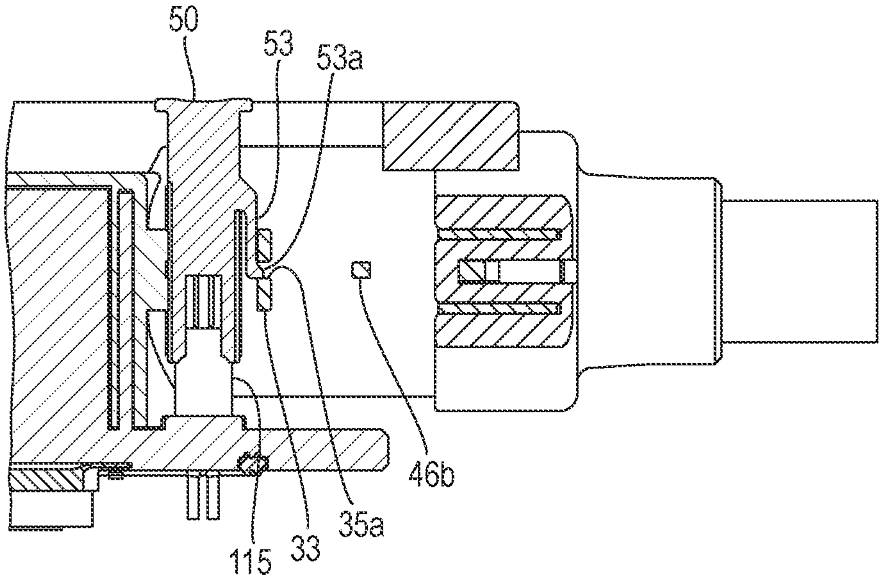
FIG. 24C is a partially enlarged view of a section taken along an E-E line of FIG. 24A.

The protrusion portion 53*a* of the spring piece 53 of the interlock housing 50 is positioned on a natural position in a manner to be in the slit 35 of the attaching portion 33 (refer to FIG. 24C). Accordingly, the protrusion portion 53*a* is abutted on the abutting surface 35*a* of the slit 35, blocking sliding of the interlock housing 50 to the closing position.

State 2: FIGS. 24A, 24B, 24C, and 27A

A state in which the lever 40 is rotated from the first position to the second position is shown. The connector 400 is drawn to the fitting position with the cam mechanism with respect to the mating connector 500 and accordingly, the main terminals 70 of the connector 400 and the mating main terminals 120 of the mating connector 500 are mutually connected. The interlock housing 50 is positioned on the opening position as is the case with the state 1.

State 3: FIGS. 25A, 25B, 25C, and 27B

A state in which the lever 40 is slid from the second position to the third position is shown. The slide insertion portion 46*a* of the lever 40 enters the slit 35 of the attaching portion 33 of the housing 30. Accordingly, the protrusion portion 53*a* of the spring piece 53 of the interlock housing 50 is pressed by the pressing portion 46*b* of the slide insertion portion 46*a*, being displaced to a retracted position, as illustrated in FIGS. 25C and 27B. This enables the interlock housing 50 to slide to the closing position.

State 4: FIGS. 26A, 26B, 26C, and 27C

A state in which the interlock housing 50 is pressed to be slid and positioned on the closing position is shown. The interlock terminals 60 and the mating interlock terminals 130 are mutually connected as illustrated in FIG. 26B, and the fitting is thus detected.

The lever slide blocking portion 54, provided to the interlock housing 50, enters the blocked portion 46*c*, which is formed by cutting out the slide insertion portion 46*a* of the lever 40, as illustrated in FIG. 27C. Accordingly, the lever 40 is fixed on the third position and thus, slide-returning to the second position is blocked.

Figure 26C:
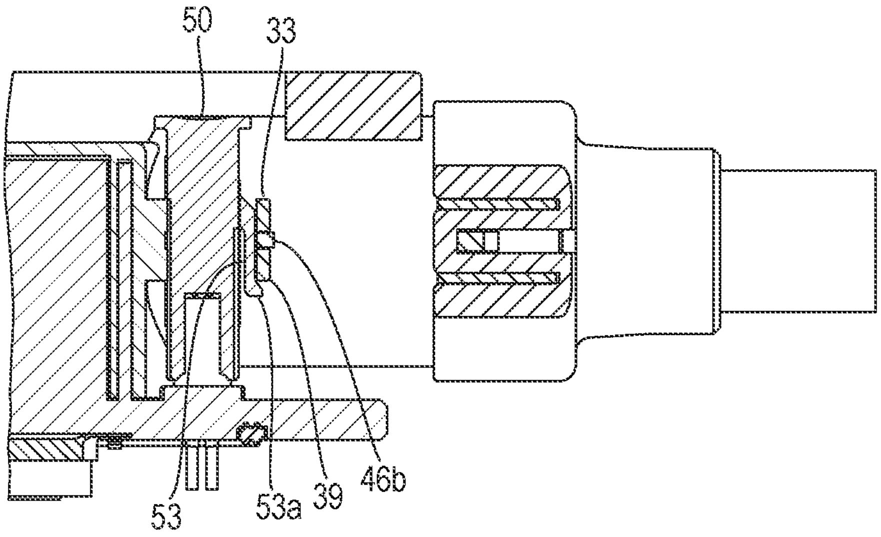
FIG. 26C is a partially enlarged view of a section taken along an E-E line of FIG. 26A.
Figure 27A:
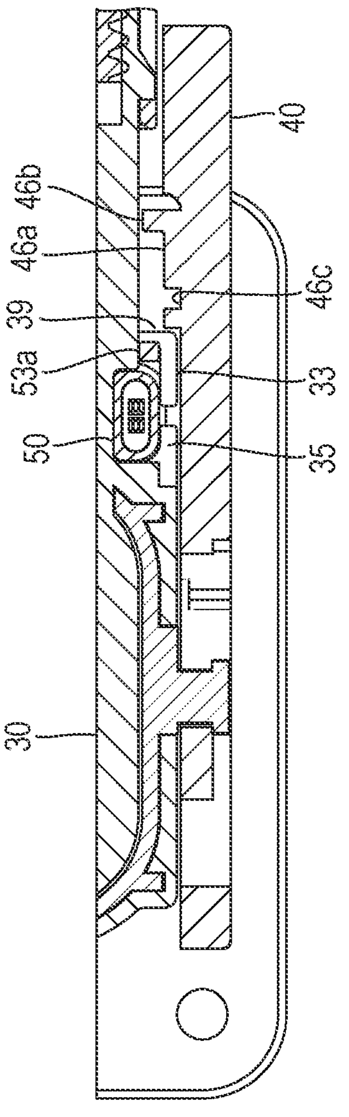
FIG. 27A is a partially enlarged transverse sectional view of the state illustrated in FIG. 24A.
Figure 27B:
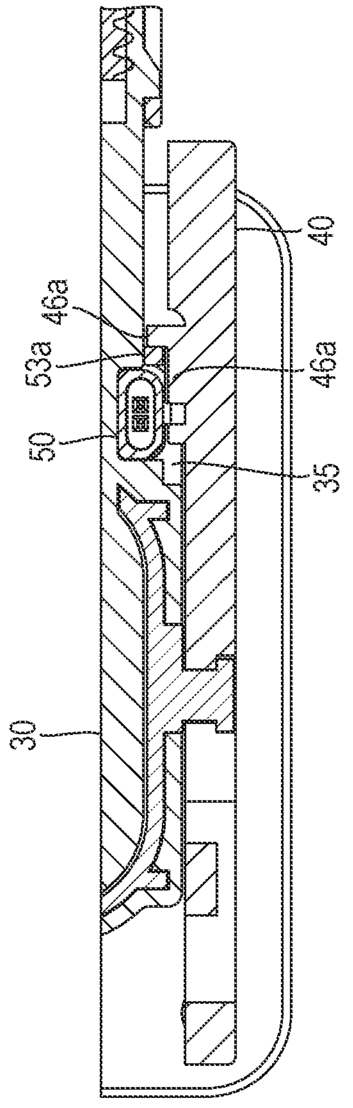
FIG. 27B is a partially enlarged transverse sectional view of the state illustrated in FIG. 25A.
Figure 27C:
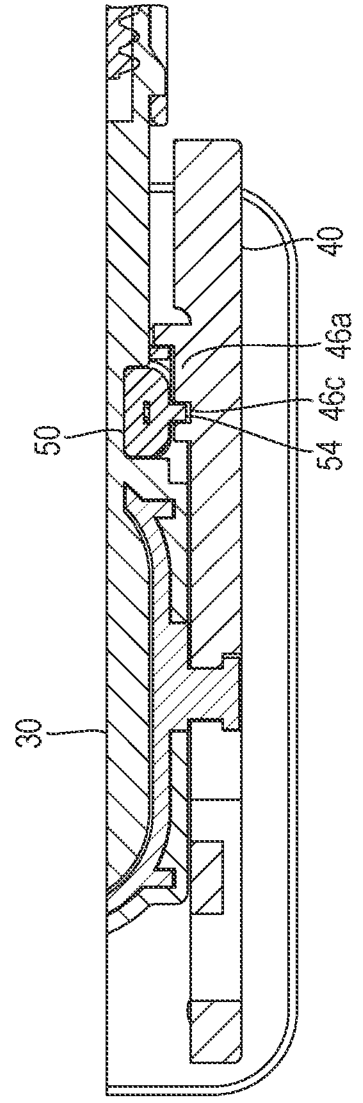
FIG. 27C is a partially enlarged transverse sectional view of the state illustrated in FIG. 26A.

In the interlock housing 50 positioned on the closing position, the protrusion portion 53*a* of the spring piece 53 comes out of the attaching portion 33 of the housing 30 and is positioned under the frame portion 39 in a manner to be caught by the frame portion 39, as illustrated in FIG. 26C. Accordingly, the interlock housing 50 is retained and locked on the closing position. Unlocking can be performed by pressing the protrusion portion 53*a* of the spring piece 53 (positioning on the retracted position), enabling the interlock housing 50 to slide-return to the opening position and enabling the lever 40 to slide-return to the second position.

The connector device of the second embodiment has been described above. The connector device of the second embodiment can provide the same advantageous effects as those of the connector device of the first embodiment described above.

In addition to this, the rotating direction of the lever 40 in the second embodiment is opposite to that of the first embodiment and the lever 40 rotates toward the cable housing portion 32 of the housing 30. Accordingly, protrusion of the lever 40 from the mating connector 500 mounted on the substrate can be suppressed compared to the first embodiment, being able to realize space saving of the mounting space.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector device comprising:

a connector that includes a housing, a lever, a main terminal, an interlock housing, and an interlock terminal; and a mating connector that includes a mating housing, a mating main terminal, and a mating interlock terminal, wherein a guide groove is formed on one of the lever and the housing and a guide shaft is formed on the other, the lever is attached to the housing so that the guide shaft is positioned on the guide groove and whereby the lever can rotate between a first position and a second position, on which the lever is to be positioned, and can slide between the second position and a third position, with respect to the housing, one of a cam groove and a driven boss, the cam groove and the driven boss constituting a cam mechanism, is formed on the lever and the other is formed on the mating housing, when the lever is rotated from the first position to the second position in a state in which the connector of which the lever is on the first position is on a fitting preparation position with respect to the mating connector, the connector is drawn to a fitting position, the fitting position being closer to the mating connector than the fitting preparation position, by the cam mechanism and the main terminal and the mating main terminal are mutually connected, when the lever is rotated from the second position to the first position in a state in which the connector of which the lever is on the second position is on the fitting position with respect to the mating connector, the connector is pushed back to the fitting preparation position by the cam mechanism and connection between the main terminal and the mating main terminal is released, the interlock terminal is attached to the interlock housing, a spring piece that has a protrusion portion, the protrusion portion protruding outward, on an end thereof is formed on the interlock housing, and the protrusion portion is displaced from a natural position to a retracted position when the protrusion portion is pressed, the interlock housing is attached to the housing in a manner to be able to slide between an opening position and a closing position, on which the interlock housing is to be positioned, where in terms of the interlock housing on the opening position, when the protrusion portion is on the natural position, the protrusion portion is abutted on an abutting surface of the housing and whereby sliding of the interlock housing to the closing position is blocked, and when the protrusion portion is on the retracted position, sliding of the interlock housing to the closing position is possible, when the connector is on the fitting position with respect to the mating connector and the interlock housing is on the opening position, the interlock terminal and the mating interlock terminal are mutually disconnected, when the connector is on the fitting position with respect to the mating connector and the interlock housing is on the closing position, the interlock terminal and the mating interlock terminal are mutually connected, when the connector is on the fitting position with respect to the mating connector and the lever is on the second position, the protrusion portion is on the natural position, and when the connector is on the fitting position with respect to the mating connector and the lever is on the third position, the protrusion portion is pressed by a pressing portion of the lever to be positioned on the retracted position.

2. The connector device according to claim 1, wherein a lever slide blocking portion is formed on the interlock housing, a blocked portion is formed on the lever, and when the interlock housing is on the closing position, the lever slide blocking portion and the blocked portion mutually interfere and sliding of the lever to the second position, the lever being on the third position, is blocked, and when the interlock housing is on the opening position, sliding of the lever to the second position is permitted.

3. The connector device according to claim 1, wherein a locking piece is formed on the interlock housing, an engaging portion is formed on the housing, and when the interlock housing is on the closing position, the locking piece is engaged with the engaging portion and the interlock housing is locked on the closing position.

4. The connector device according to claim 2, wherein a locking piece is formed on the interlock housing, an engaging portion is formed on the housing, and when the interlock housing is on the closing position, the locking piece is engaged with the engaging portion and the interlock housing is locked on the closing position.

5. The connector device according to claim 1, wherein a holding portion is formed on the mating housing, a held portion is formed on the lever, and when the connector is on the fitting position and the lever is on the third position, the held portion is held by the holding portion.

6. The connector device according to claim 2, wherein a holding portion is formed on the mating housing, a held portion is formed on the lever, and when the connector is on the fitting position and the lever is on the third position, the held portion is held by the holding portion.

7. The connector device according to claim 3, wherein a holding portion is formed on the mating housing, a held portion is formed on the lever, and when the connector is on the fitting position and the lever is on the third position, the held portion is held by the holding portion.

8. The connector device according to claim 4, wherein a holding portion is formed on the mating housing, a held portion is formed on the lever, and when the connector is on the fitting position and the lever is on the third position, the held portion is held by the holding portion.

* * * * *